United States Patent
Imamura

(10) Patent No.: US 8,532,454 B2
(45) Date of Patent: Sep. 10, 2013

(54) MULTI-CORE OPTICAL FIBER

(75) Inventor: Katsunori Imamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 275 days.

(21) Appl. No.: 13/045,039

(22) Filed: Mar. 10, 2011

(65) Prior Publication Data

US 2011/0206331 A1  Aug. 25, 2011

Related U.S. Application Data

(63) Continuation-in-part of application No. PCT/JP2010/056789, filed on Apr. 15, 2010.

(30) Foreign Application Priority Data

Apr. 16, 2009  (JP) .................................. 2009-100114
Mar. 16, 2010  (JP) .................................. 2010-059954

(51) Int. Cl.
*G02B 6/02* (2006.01)

(52) U.S. Cl.
USPC ............................ 385/126; 385/127; 385/128

(58) Field of Classification Search
USPC ................................................. 385/126–128
See application file for complete search history.

(56) References Cited

U.S. PATENT DOCUMENTS

| 7,657,141 | B2 | 2/2010 | Imamura |
| 7,693,379 | B2 | 4/2010 | Imamura |
| 7,742,671 | B2 | 6/2010 | Koyamada et al. |
| 2005/0249471 | A1 | 11/2005 | Aikawa et al. |
| 2009/0324242 | A1* | 12/2009 | Imamura ...................... 398/142 |
| 2010/0054742 | A1 | 3/2010 | Imamura |
| 2010/0150507 | A1 | 6/2010 | Takahashi et al. |
| 2010/0290750 | A1 | 11/2010 | Imamura |
| 2010/0296784 | A1 | 11/2010 | Imamura |
| 2011/0026890 | A1 | 2/2011 | Takahashi et al. |
| 2011/0091176 | A1 | 4/2011 | Takahashi et al. |

FOREIGN PATENT DOCUMENTS

| JP | 1-295207 | 11/1989 |
| JP | 5-341147 | 12/1993 |
| JP | 9-205239 | 8/1997 |
| JP | 2003-337241 | 11/2003 |
| JP | 2008-310042 | 12/2008 |

OTHER PUBLICATIONS

D.M. Taylor et al., "Demonstration of multi-core photonic crystal fibre in an optical interconnect", Electronics Letters, Mar. 16, 2006, vol. 42, No. 6, 2 pages.

(Continued)

*Primary Examiner* — Ryan Lepisto
(74) *Attorney, Agent, or Firm* — Oblon, Spivak, McClelland, Maier & Neustadt, L.L.P.

(57) ABSTRACT

A multi-core optical fiber includes a plurality of core portions. The diameter of each of the core portions is 12 micrometers or smaller, the relative refractive-index difference of the core portions with respect to the cladding portion is 0.2% or larger, the cut-off wavelength is 1.53 micrometers or smaller, the bending loss at a 1.55-micrometer wavelength is 10 dB/m or smaller, the effective core area at a 1.55-micrometer wavelength is 30 $\mu m^2$ or larger, and the cross-talk of light between the core portions is −35 decibels or smaller.

9 Claims, 21 Drawing Sheets

(56) References Cited

OTHER PUBLICATIONS

Japanese International Search Report issued May 25, 2010 in PCT/JP2010/056789 filed Apr. 15, 2010 (with English Translation).

Japanese Written Opinion issued May 17, 2010 in PCT/JP2010/056789 filed Apr. 15, 2010.
U.S. Appl. No. 13/360,853, filed Jan. 30, 2012, Imamura.
U.S. Appl. No. 13/238,902, filed Sep. 21, 2011, Imamura.

* cited by examiner

FIG.6

| ITEM | 2a | Δ | λc | Aeff | BENDING LOSS | WAVELENGTH DISPERSION | DISPERSION SLOPE | CORE PITCHES | | | | | |
|---|---|---|---|---|---|---|---|---|---|---|---|---|---|
| | | | | | | | | 1 m | 10 m | 100 m | 1 km | 10 km | 100 km |
| UNIT | μm | % | μm | μm² | dB/m | ps/nm/km | ps/nm²/km | μm | | | | | |
| CALCULATION EXAMPLE 1 | 3.55 | 0.783 | 0.85 | 43.2 | 10 | -9.5 | 0.07 | 46.5 | 54.5 | 62.5 | 70.4 | 78.4 | 86.4 |
| CALCULATION EXAMPLE 2 | 5.39 | 0.475 | 1 | 58.7 | 10 | 7.1 | 0.06 | 46.9 | 54.7 | 62.6 | 70.5 | 78.4 | 86.3 |
| CALCULATION EXAMPLE 3 | 9.17 | 0.284 | 1.31 | 98.0 | 10 | 17.3 | 0.06 | 47.7 | 55.4 | 63.2 | 70.9 | 78.6 | 86.4 |
| CALCULATION EXAMPLE 4 | 11.72 | 0.238 | 1.53 | 129.8 | 10 | 19.5 | 0.06 | 48.3 | 56.0 | 63.6 | 71.3 | 78.9 | 86.6 |
| CALCULATION EXAMPLE 5 | 3.14 | 0.997 | 0.85 | 34.1 | 0.5 | -18.2 | 0.07 | 42.1 | 49.3 | 56.4 | 63.5 | 70.6 | 77.8 |
| CALCULATION EXAMPLE 6 | 4.82 | 0.592 | 1 | 47.2 | 0.5 | 3.4 | 0.06 | 42.7 | 49.8 | 56.9 | 64.1 | 71.2 | 78.3 |
| CALCULATION EXAMPLE 7 | 8.22 | 0.353 | 1.31 | 78.9 | 0.5 | 16.3 | 0.06 | 43.5 | 50.5 | 57.4 | 64.4 | 71.4 | 78.3 |
| CALCULATION EXAMPLE 8 | 10.55 | 0.294 | 1.53 | 105.1 | 0.5 | 19.0 | 0.06 | 44.2 | 51.1 | 58.0 | 64.8 | 71.7 | 78.6 |
| CALCULATION EXAMPLE 9 | 9.5 | 0.280 | 1.333 | 100.9 | 7.6 | 17.7 | 0.06 | 47.3 | 54.8 | 62.4 | 70.0 | 77.5 | 85.1 |
| CALCULATION EXAMPLE 10 | 7 | 0.670 | 1.5259 | 46.2 | 0.0 | 15.8 | 0.06 | 30.9 | 35.5 | 40.1 | 44.8 | 49.4 | 54.0 |
| CALCULATION EXAMPLE 11 | 5.5 | 0.950 | 1.4259 | 31.0 | 0.0 | 11.2 | 0.05 | 27.1 | 31.2 | 35.2 | 39.3 | 43.4 | 47.4 |
| CALCULATION EXAMPLE 12 | 10.5 | 0.296 | 1.5291 | 104.3 | 0.4 | 19.0 | 0.06 | 44.0 | 50.9 | 57.7 | 64.5 | 71.3 | 78.2 |
| CALCULATION EXAMPLE 13 | 8.5 | 0.420 | 1.477 | 71.4 | 0.0 | 17.4 | 0.06 | 38.3 | 44.2 | 50.1 | 56.0 | 61.9 | 67.7 |
| CALCULATION EXAMPLE 14 | 8 | 0.500 | 1.5175 | 61.3 | 0.0 | 17.0 | 0.06 | 35.2 | 40.5 | 45.8 | 51.2 | 56.5 | 61.8 |
| CALCULATION EXAMPLE 15 | 3 | 0.980 | 0.8054 | 38.7 | 9.3 | -19.1 | 0.08 | 46.5 | 54.5 | 62.4 | 70.4 | 78.4 | 86.3 |

FIG.9

| ITEM | 2a | Δ | λc | Aeff | BENDING LOSS | WAVELENGTH DISPERSION | DISPERSION SLOPE | CORE PITCHES | | | | | |
|---|---|---|---|---|---|---|---|---|---|---|---|---|---|
| | | | | | | | | 1 m | 10 m | 100 m | 1 km | 10 km | 100 km |
| UNIT | μm | % | μm | μm² | dB/m | ps/nm/km | ps/nm²/km | μm | | | | | |
| CALCULATION EXAMPLE 16 | 3.55 | 0.783 | 0.85 | 43.2 | 10 | -9.5 | 0.07 | 52.7 | 60.7 | 68.7 | 76.6 | 84.6 | 92.6 |
| CALCULATION EXAMPLE 17 | 5.39 | 0.475 | 1 | 58.7 | 10 | 7.1 | 0.06 | 53.0 | 60.9 | 68.8 | 76.6 | 84.5 | 92.4 |
| CALCULATION EXAMPLE 18 | 9.17 | 0.284 | 1.31 | 98.0 | 10 | 17.3 | 0.06 | 53.7 | 61.4 | 69.2 | 76.9 | 84.6 | 92.4 |
| CALCULATION EXAMPLE 19 | 11.72 | 0.238 | 1.53 | 129.8 | 10 | 19.5 | 0.06 | 54.3 | 61.9 | 69.6 | 77.2 | 84.9 | 92.6 |
| CALCULATION EXAMPLE 20 | 3.14 | 0.997 | 0.85 | 34.1 | 0.5 | -18.2 | 0.07 | 47.7 | 54.8 | 61.9 | 69.1 | 76.2 | 83.3 |
| CALCULATION EXAMPLE 21 | 4.82 | 0.592 | 1 | 47.2 | 0.5 | 3.4 | 0.06 | 48.3 | 55.4 | 62.5 | 69.6 | 76.7 | 83.8 |
| CALCULATION EXAMPLE 22 | 8.22 | 0.353 | 1.31 | 78.9 | 0.5 | 16.3 | 0.06 | 48.9 | 55.9 | 62.9 | 69.8 | 76.8 | 83.8 |
| CALCULATION EXAMPLE 23 | 10.55 | 0.294 | 1.53 | 105.1 | 0.5 | 19.0 | 0.06 | 49.5 | 56.4 | 63.3 | 70.2 | 77.1 | 84.0 |
| CALCULATION EXAMPLE 24 | 9.5 | 0.280 | 1.333 | 100.9 | 7.6 | 17.7 | 0.06 | 53.2 | 60.7 | 68.3 | 75.8 | 83.4 | 91.0 |
| CALCULATION EXAMPLE 25 | 7 | 0.670 | 1.5259 | 46.2 | 0.0 | 15.8 | 0.06 | 34.5 | 39.1 | 43.7 | 48.4 | 53.0 | 57.6 |
| CALCULATION EXAMPLE 26 | 5.5 | 0.950 | 1.4259 | 31.0 | 0.0 | 11.2 | 0.05 | 30.3 | 34.3 | 38.4 | 42.5 | 46.5 | 50.6 |
| CALCULATION EXAMPLE 27 | 10.5 | 0.296 | 1.5291 | 104.3 | 0.4 | 19.0 | 0.06 | 49.3 | 56.2 | 63.0 | 69.8 | 76.7 | 83.5 |
| CALCULATION EXAMPLE 28 | 8.5 | 0.420 | 1.477 | 71.4 | 0.0 | 17.4 | 0.06 | 42.9 | 48.8 | 54.7 | 60.6 | 66.4 | 72.3 |
| CALCULATION EXAMPLE 29 | 8 | 0.500 | 1.5175 | 61.3 | 0.0 | 17.0 | 0.06 | 39.3 | 44.7 | 50.0 | 55.3 | 60.6 | 66.0 |
| CALCULATION EXAMPLE 30 | 3 | 0.980 | 0.8054 | 38.7 | 9.3 | -19.1 | 0.08 | 52.7 | 60.7 | 68.6 | 76.6 | 84.6 | 92.5 |

FIG.15A

| | Δ | 2a | OUTSIDE DIAMETER OF CLADDING PORTION | INTERVAL DISTANCE | TRANSMISSION LOSS | Aeff | λcc | λc |
|---|---|---|---|---|---|---|---|---|
| | % | μm | μm | μm | dB/km | μm² | nm | nm |
| EMBODIMENT EXAMPLE 1 | 0.34 | 8.3 | 204.0 | 44.8 | 0.383 | 84 | 1411 | 1469 |
| EMBODIMENT EXAMPLE 2 | 0.34 | 8.3 | 209.9 | 47.5 | 0.316 | 84 | 1410 | 1468 |

FIG.15B

| Δ: 0.287%  2a: 9.1 μm  OUTSIDE DIAMETER OF CLADDING PORTION: 238.4 μm INTERVAL DISTANCE: 48.4 μm | | | | | | | | |
|---|---|---|---|---|---|---|---|---|
| CORE PORTION REFERENCE SYMBOL | | A4 | B4 | C4 | D4 | E4 | F4 | G4 |
| λcc | nm | 1438 | 1395 | 1336 | 1399 | 1320 | 1405 | 1324 |
| Aeff | μm² | 92.1 | 89.8 | 88.4 | 90.3 | 87.1 | 90.4 | 87.8 |
| MFD | μm | 11.1 | 11.0 | 10.9 | 11.0 | 10.8 | 11.0 | 10.9 |
| BENDING LOSS | dB/m | 1.0 | 2.7 | 7.8 | 2.6 | 7.3 | 2.5 | 7.3 |
| TRANSMISSION LOSS | dB/km | 0.263 | 0.268 | 0.296 | 0.282 | 0.315 | 0.282 | 0.298 |
| WAVELENGTH DISPERSION | ps/nm/km | 18.9 | – | 17.9 | 18.4 | – | – | – |
| DISPERSION SLOPE | ps/nm²/km | 0.061 | – | 0.060 | 0.060 | – | – | – |

FIG.22

| | CORE PORTION REFERENCE SYMBOL | Δ | 2a | TRANSMISSION LOSS | WAVELENGTH DISPERSION | DISPERSION SLOPE | Aeff | λcc | λc | BENDING LOSS |
|---|---|---|---|---|---|---|---|---|---|---|
| | | % | μm | dB/km | ps/nm/km | ps/nm²/km | μm² | nm | nm | dB/m |
| REFERENCE EXAMPLE 1 | A1 | 0.3 | 9.94 | 0.254 | 19 | 0.062 | 110 | 1367 | 1425 | 10.1 |
| | B1 | 0.3 | 9.74 | 0.444 | 18.1 | 0.06 | 103 | 1337 | 1395 | 16.7 |
| | C1 | 0.3 | 9.88 | 0.398 | 18.6 | 0.06 | 106 | 1357 | 1415 | 7.1 |
| REFERENCE EXAMPLE 2 | A2 | 0.3 | 10.02 | 0.205 | 19.1 | 0.062 | 101 | 1378 | 1436 | 4.4 |
| | B2 | 0.3 | 9.94 | 0.273 | 18.6 | 0.06 | 103 | 1367 | 1425 | 7.2 |
| | C2 | 0.3 | 9.88 | 0.27 | 18.4 | 0.061 | 99 | 1357 | 1415 | 13.3 |

FIG.25

| CORE PORTION REFERENCE SYMBOL | Δ | | 2a | | TRANSMISSION LOSS | | WAVELENGTH DISPERSION | | DISPERSION SLOPE | | Aeff | | λcc | | λc | | BENDING LOSS | |
|---|---|---|---|---|---|---|---|---|---|---|---|---|---|---|---|---|---|---|
| | | % | | μm | | dB/km | | ps/nm/km | | ps/nm²/km | | μm² | | nm | | nm | | dB/m |
| REFERENCE EXAMPLE 3 | A3 | 0.31 | 10.6 | | 0.213 | | 19.6 | | 0.062 | | 110 | | 1491 | | 1549 | | 3 | |
| | B3 | 0.31 | 10.4 | | 0.237 | | 19.4 | | 0.062 | | 107 | | 1470 | | 1528 | | 3.9 | |
| | C3 | 0.31 | 10.2 | | 0.237 | | 19.0 | | 0.061 | | 99 | | 1408 | | 1466 | | 8.1 | |

FIG.28

| ITEM | UNIT | REFERENCE EXAMPLE 1 | REFERENCE EXAMPLE 2 | REFERENCE EXAMPLE 3 |
|---|---|---|---|---|
| INTERVAL DISANCE BETWEEN CORE PORTIONS | $\mu m$ | 40 | 40 | 46 |
| OUTSIDE DIAMETER OF CLADDING PORTION | $\mu m$ | 141 | 215 | 217 |
| THICKNESS OF CLADDING PORTION | $\mu m$ | 30.5 | 67.5 | 62.5 |
| THICKNESS OF COATING | $\mu m$ | 37.5 | 37.5 | 62.5 |
| OUTSIDE DIAMETER OF COATING | $\mu m$ | 216 | 290 | 342 |

MULTI-CORE OPTICAL FIBER

CROSS-REFERENCE TO RELATED APPLICATIONS

This application is a continuation-in-part of PCT/JP2010/056789 filed on Apr. 15, 2010 which is based upon and claims the benefit of priority from the prior Japanese Patent Application No. 2009-100114, filed on Apr. 16, 2009 and the prior Japanese Patent Application No. 2010-059954, filed on Mar. 16, 2010; the entire content of which are incorporated herein by reference.

BACKGROUND OF THE INVENTION

1. Field of the Invention

The present invention relates to a multi-core optical fiber.

2. Description of the Related Art

In recent years, the demand for networks keeps increasing. To continually accommodate the increasing demand, transmission-line-related technology with which it is possible to configure large-capacity optical communication networks is in need at present and in the future.

Examples of technology used for enlarging the capacity of a network include multi-core optical fibers. A multi-core optical fiber is configured so that a plurality of core portions are included in the one optical fiber. The following non-patent document indicates that it is possible to enlarge a transmission capacity by transmitting an individual optical signal in each of the core portions in a multi-core optical fiber: D. M. Taylor, C. R. Bennett, T. J. Shepherd, L. F. Michaille, M. D. Nielsen, and H. R. Simonsen, "Demonstration of multi-core photonic crystal fibre in an optical interconnect", Electronics Letters, vol. 42, no. 6, pp. 331-332 (2006). The multi-core optical fiber disclosed in this document is a hole-structure optical fiber, which has been drawing attentions in recent years. In such a hole-structure optical fiber, a strong confinement of light in the core portions is realized by the large number of holes formed in the cladding portion. As a result, it is possible to configure the distance between the core portions so as to be shorter. Accordingly, it is possible to dispose a large number of core portions in a small cross-section area, and it is therefore possible to arrange the core portions with a high density.

Further, to enlarge the transmission capacity, it is desirable to use a multi-core optical fiber that operates in a single mode in a larger wavelength bandwidth. For example, in the case where the cut-off wavelength of a multi-core optical fiber is 1.53 micrometers, the multi-core optical fiber is able to perform a single-mode transmission in a wavelength bandwidth that is equal to or larger than 1.53 micrometers. Further, by configuring the cut-off wavelength so as to be 1 micrometer or 0.85 micrometer, each of which is even shorter, the multi-core optical fiber is able to perform a single-mode transmission in an even broader bandwidth. As a result, it is possible to further enlarge the transmission capacity.

SUMMARY OF THE INVENTION

It is an object of the present invention to at least partially solve the problems in the conventional technology.

In accordance with one aspect of the present invention, a multi-core optical fiber comprising: a plurality of core portions; and a cladding portion that is positioned so as to surround outside of the core portions and has a refractive index that is lower than a refractive index of each of the core portions, wherein a diameter of each of the core portions is equal to or smaller than 12 micrometers, a relative refractive-index difference of each of the core portions with respect to the cladding portion is equal to or larger than 0.2%, a cut-off wavelength is equal to or shorter than 1.53 micrometers, a bending loss caused by winding around a diameter of 20 millimeters at a wavelength of 1.55 micrometers is equal to or smaller than 10 dB/m, an effective core area at a wavelength of 1.55 micrometers is equal to or larger than 30 $\mu m^2$, and an interval distance between each of the core portions and another one of the core portions positioned adjacent thereto is set so that cross-talk of light between these core portions for a total length is equal to or smaller than −35 decibels at a wavelength of 1.55 micrometers.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table in which various optical characteristics of multi-core optical fibers including two core portions and core pitches with respect to predetermined total lengths are shown as calculation examples 1 to 15, in correspondence with a situation in which the combinations of a core diameter and a relative refractive-index difference within the area shown in FIG. 5 have been selected;

FIG. 9 is a table in which various optical characteristics of multi-core optical fibers including seven core portions and core pitches with respect to predetermined total lengths are shown as calculation examples 16 to 30, in correspondence with a situation in which the combinations of a core diameter and a relative refractive-index difference within the area shown in FIG. 5 have been selected;

FIG. 15A is a table showing optical characteristics of core portions in multi-core optical fibers according to embodiment examples 1 and 2;

FIG. 15B is a table showing optical characteristics of core portions in multi-core optical fibers according to embodiment example 3;

FIG. 22 is a table showing core diameters and relative refractive-index differences of the core portions in the multi-core optical fibers according to reference examples 1 and 2, as well as optical characteristics of the core portions;

FIG. 25 is a table showing core diameters and relative refractive-index differences of the core portions in the multi-core optical fibers according to reference example 3, as well as optical characteristics of the core portions;

FIG. 28 is a table showing structural characteristics of the multi-core optical fibers of the reference examples 1 to 3.

DETAILED DESCRIPTION OF THE PREFERRED EMBODIMENTS

Figure 1:
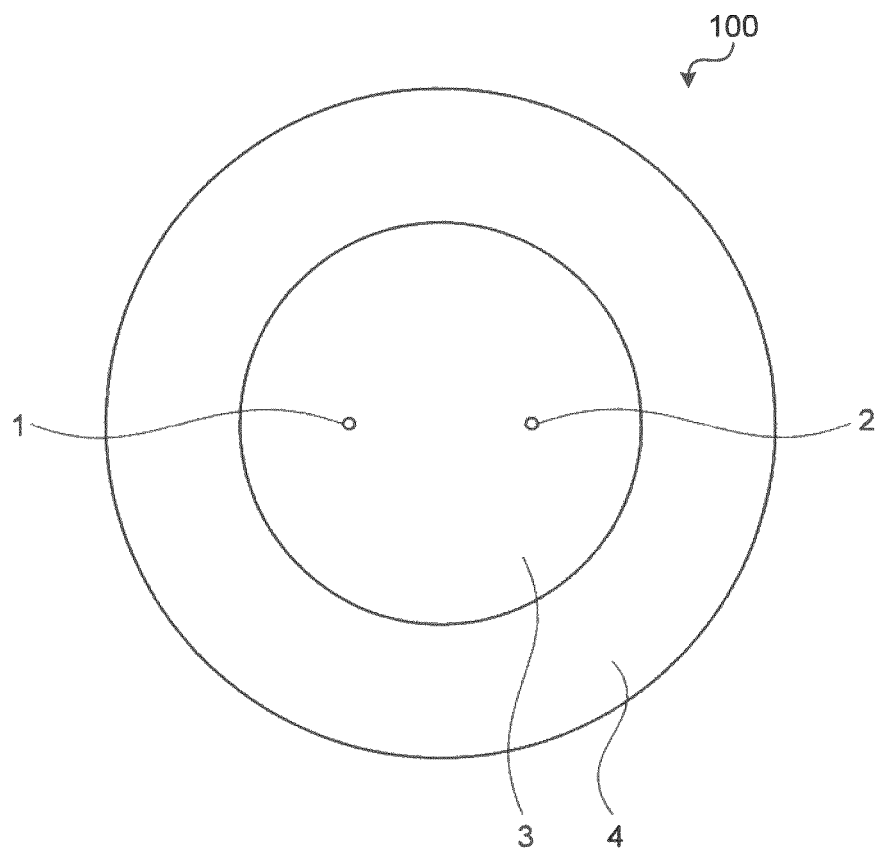
FIG. 1 is a schematic cross-sectional view of a multi-core optical fiber according to a first embodiment of the present invention.

Exemplary embodiments of a multi-core optical fiber according to the present invention will be explained in detail below with reference to the accompanying drawings. The present invention is not limited to the embodiments. Various modifications can be made without departing from the scope of the present invention. In the drawings, identical or corresponding elements are appropriately denoted by identical symbols. In the present specification, a "cut-off wavelength" ($\lambda_c$) denotes a fiber cut-off wavelength defined by the International Telecommunication Union Telecommunication Standardization Sector (ITU-T) G. 650.1. Further, other terms that are not particularly defined in the present specification may be compliant with the definitions and the measuring methods according to the ITU-T G. 650.1.

A multi-core optical fiber in which the hole-structure is used, however, has a large number of holes for the purpose of realizing the confinement of the light in the core portions. Accordingly, to manufacture a multi-core optical fiber that has desired optical characteristics, it is necessary to maintain the diameter of each of the holes with a predetermined dimension in the length direction of the optical fiber. Thus, it is necessary to stably control the diameter of each of the holes in the process of drawing of the optical fiber. To realize the stable control, it is necessary to cause gas to flow through the holes by applying a predetermined level of pressure so that the diameter of each of the holes can be maintained with the predetermined dimension, and it is also necessary to precisely control the gas pressure. As a result, a problem arises where it is difficult to improve productivity. In contrast, according to the embodiments, a multi-core optical fiber having high productivity is realized.

FIG. 1 is a schematic cross-sectional view of a multi-core optical fiber according to a first embodiment of the present invention. As shown in FIG. 1, a multi-core optical fiber 100 includes two core portions (i.e., a core portion 1 and a core portion 2), a cladding portion 3 that is positioned so as to surround the outside of the core portions 1 and 2, and a coating portion 4 that is formed so as to surround the outside of the cladding portion 3.

Each of the core portions 1 and 2 and the cladding portion 3 is made from, for example, silica-based glass. The cladding portion 3 has a lower refractive index than the refractive index of each of the core portions 1 and 2. For example, each of the core portions 1 and 2 is made from silica glass which is doped with germanium (Ge), which is a dopant that enhances the refractive index. In contrast, the cladding portion 3 is made from pure-silica glass that does not contain any dopant used for adjusting the refractive index. As refractive index profiles of the core portions 1 and 2, a step-index type is used.

Further, the diameter (i.e., the core diameter) of each of the core portions 1 and 2 is 3.55 micrometers. The relative refractive-index difference of each of the core portions 1 and 2 with respect to the cladding portion 3 is 0.783%. The distance (i.e., the interval distance) between the central axis of the core portion 1 and the central axis of the core portion 2 is 78.4 micrometers. The outside diameter of the cladding portion 3 is set appropriately so that the core portions 1 and 2 can be positioned with the interval distance mentioned above. The outside diameter of the cladding portion 3 is, for example, within the range of 125 micrometers to 200 micrometers. The outside diameter of the coating portion 4 is set appropriately so that the cladding portion 3 can be protected. The outside diameter of the coating portion 4 is, for example, within the range of 250 micrometers to 400 micrometers.

In this situation, it is possible to define the relative refractive-index difference $\Delta$ as shown below in Expression (1), where the maximum refractive index of the core portions is expressed as n1, whereas the refractive index of the cladding portion is expressed as nc:

$$\Delta = \{(n1-nc)/nc\} \times 100 [\%] \quad (1)$$

Further, a core diameter 2a is defined as a diameter in a position having a relative refractive-index difference equal to a half of $\Delta$, in a border region between the core portion and the cladding portion.

Because the core diameters and the relative refractive-index difference of the core portions 1 and 2 are set to the values described above, the multi-core optical fiber 100 is configured so that, with respect to the core portions 1 and 2, the cut-off wavelength is 0.85 micrometer, which is shorter than 1.53 micrometers, whereas the bending loss caused by winding around a diameter of 20 millimeters at a wavelength of 1.55 micrometers is 10 dB/m, while the effective core area at a wavelength of 1.55 micrometers is 43.2 $\mu m^2$, which is larger than 30 $\mu m^2$. As a result, the multi-core optical fiber 100 is able to transmit in a single mode, throughout a large wavelength bandwidth that is equal to or longer than 0.85 micrometer, optical signals having a wavelength within the bandwidth. In addition, even when the multi-core optical fiber 100 is configured into a cable structure for the use as an optical transmission line, the bending loss to be caused exhibits a value that is suitable for practical use. Further, although optical non-linearity could be an obstruction during an optical transmission, the multi-core optical fiber 100 is an optical fiber that has a sufficiently low optical non-linearity. Thus, the multi-core optical fiber 100 is suitable for a large-capacity optical transmission. In the following sections, the bending loss caused by winding around a diameter of 20 millimeters will be simply referred to as a "bending loss".

Further, because the interval distance between the core portion 1 and the core portion 2 is set to the value described above, the multi-core optical fiber 100 is configured so that cross-talk of the light between the core portions is equal to or smaller than −35 decibels at a wavelength of 1.55 micrometers in the situation where the total length of the multi-core optical fiber 100 is equal to or longer than 10 kilometers. Thus, the cross-talk of the optical signals that are individually transmitted through the core portions 1 and 2 is sufficiently small.

Next, the cross-talk in the multi-core optical fiber 100 will be explained more specifically. In a waveguide structure in which the two core portions are arranged parallel to each other such as the core portions 1 and 2 included in the multi-core optical fiber 100, the magnitude of interference of the light between the core portions can be expressed by using the mode coupling theory. In other words, it is possible to calculate a power P of the light that transfers to the core portion 2 due to mode coupling while the light that has entered the core portion 1 is transmitted through the core portion 1, by using an expression $P=f\times\sin^2(\chi z)$ where the transmission distance is expressed as z, whereas the mode coupling constant between the two core portions is expressed as $\chi$. In this situation, in the case where the core diameters and the relative refractive-index differences of the core portion 1 and the core portion 2 are equal to each other, f=1 is satisfied. Accordingly, in the case where $z=\pi/(2\chi)$ is satisfied, P=1 is satisfied so that 100% of the power of the light transfers from the one of the core portions to the other core portion. The transmission distance that is required for the 100% of the power of the light to transfer to the other core portion in this manner is called a coupling length L. In other words, $L=\pi/(2\chi)$ is satisfied. It should be noted that the mode coupling constant $\chi$ is determined by the core diameters and the relative refractive-index differences of the core portions 1 and 2 and by the interval distance between the core portions 1 and 2.

In this situation, the interval distance between the core portion 1 and the core portion 2 in the multi-core optical fiber 100 is configured so that the value of P is equal to or smaller than 0.03%, with respect to the core diameters and the relative refractive-index differences of the core portions 1 and 2, and a predetermined total length that have been set. As a result, the cross-talk between the core portions with respect to the predetermined total length described above is equal to or smaller than −35 decibels. Thus, the cross-talk between the light signals that are transmitted through the two core portions is sufficiently small.

Further, the multi-core optical fiber 100 is configured so that the optical signals are transmitted while being confined in the core portions 1 and 2, due to the refractive-index differences between the core portions 1 and 2 and the cladding portion 3. Accordingly, it is possible to manufacture the multi-core optical fiber 100 without the necessity of precise pressure control, unlike in the example with a hole-structure optical fiber. Thus, the multi-core optical fiber 100 has high productivity.

Figure 2:
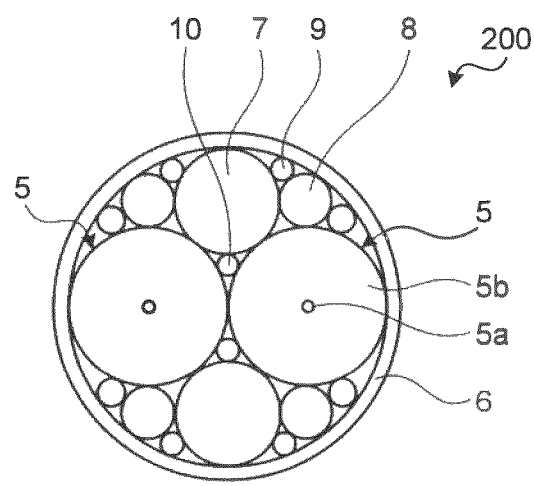
FIG. 2 is a drawing for explaining an example of a method for manufacturing the multi-core optical fiber shown in FIG. 1.

More specifically, it is possible to manufacture the multi-core optical fiber 100 by using, for example, a method described below. FIG. 2 is a drawing for explaining an example of a method for manufacturing the multi-core optical fiber 100 shown in FIG. 1. As shown in FIG. 2, according to this manufacturing method, first, two capillaries 5 are disposed in a glass tube 6 that is made from the same material as the material of which the cladding portion 3 is made. Each of the capillaries 5 has a core region 5a for forming the core portion 1 or 2 and a cladding region 5b for forming the cladding portion 3. It is possible to configure each of the capillaries 5 by using a material obtained by stretching an optical fiber preform used for manufacturing a conventional optical fiber. After that, the space within the glass tube 6 is filled with filling capillaries 7 to 10 each of which is made of the same material as the material of which the cladding portion 3 is made, so as to manufacture an optical fiber preform 200. Alternatively, the space may be filled with glass powder instead of the filling capillaries 7 to 10.

Subsequently, an optical fiber is drawn from the optical fiber preform 200 while maintaining an outside diameter of the optical fiber that has been calculated so as to realize a predetermined core diameter and a predetermined interval distance between the core portions. As a result, it is possible to manufacture the multi-core optical fiber 100 shown in FIG. 1 without the necessity of precise pressure control. It should be noted that, because the presence of the filling capillaries 7 to 10 prevents the cross-sectional shape of the optical fiber from being deformed out of a circular shape during the process of the drawing, it is possible to prevent the outer circumference of the optical fiber from being distorted.

Alternatively, it is acceptable to use, as the material for the capillaries 5, a material obtained by stretching an optical fiber preform used for manufacturing an optical fiber, which has a small transmission loss caused by light absorption of an OH base near the wavelength of 1383 nanometers and which is defined in the ITU-T G. 652. C or G. 652. D. By using the material, it is possible to manufacture a multi-core optical fiber that is suitable for an optical signal transmission that uses a wavelength band of E-band (approximately 1360 nanometers to 1460 nanometers).

As explained above, the multi-core optical fiber 100 according to the first embodiment is a multi-core optical fiber that has high productivity and is suitable for a large-capacity optical transmission.

The multi-core optical fiber according to the present invention is not limited to the examples described in the first embodiment. In other words, there is no particular limitation as long as the multi-core optical fiber is configured in such a manner that the diameter of each of the core portions is equal to or smaller than 12 micrometers, that the relative refractive-index difference is equal to or larger than 0.2%, that the cut-off wavelength is equal to or shorter than 1.53 micrometers, that, at a wavelength of 1.55 micrometers, the bending loss is equal to or smaller than 10 dB/m while the effective core area is equal to or larger than 30 μm², and that the cross-talk of the light between the core portions is equal to or smaller than −35 decibels at a wavelength of 1.55 micrometers. In the following sections, the multi-core optical fiber according to an aspect of the present invention corresponding to the situation where the number of the core portions is two will be explained more specifically, through calculations that use Finite Element Method (FEM) simulations.

Figure 3:
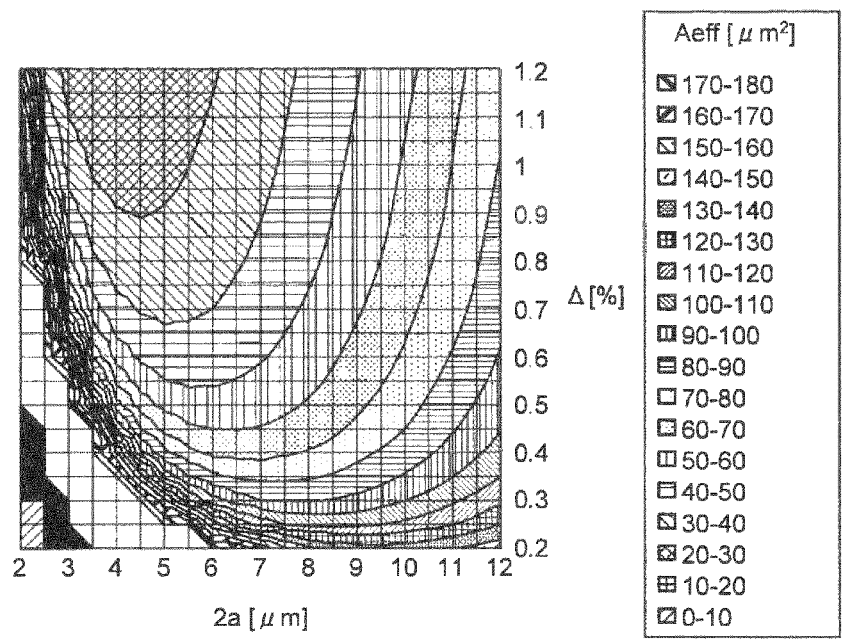
FIG. 3 is a graph of effective core areas in relation to combinations of a core diameter and a relative refractive-index difference.

First, effective core areas that are obtained in the case where the core diameter and the relative refractive-index difference of the core portions have been set will be explained. FIG. 3 is a graph of effective core areas at a wavelength of 1.55 micrometers, in relation to combinations of a core diameter and a relative refractive-index difference. In FIG. 3, "$2a$" on the horizontal axis expresses the core diameter, whereas "Δ" on the vertical axis expresses the relative refractive-index difference.

In FIG. 3, for example, data points corresponding to a core diameter of 4 micrometers and a relative refractive-index difference of 1% are positioned in the area where the effective core area is 20 μm² to 30 μm². There is a tendency that, an area gets closer to the lower right side compared to the above area in the graph (i.e., as the core diameter is configured so as to be larger and the relative refractive-index difference is configured so as to be smaller), the effective core area becomes larger.

Figure 4:
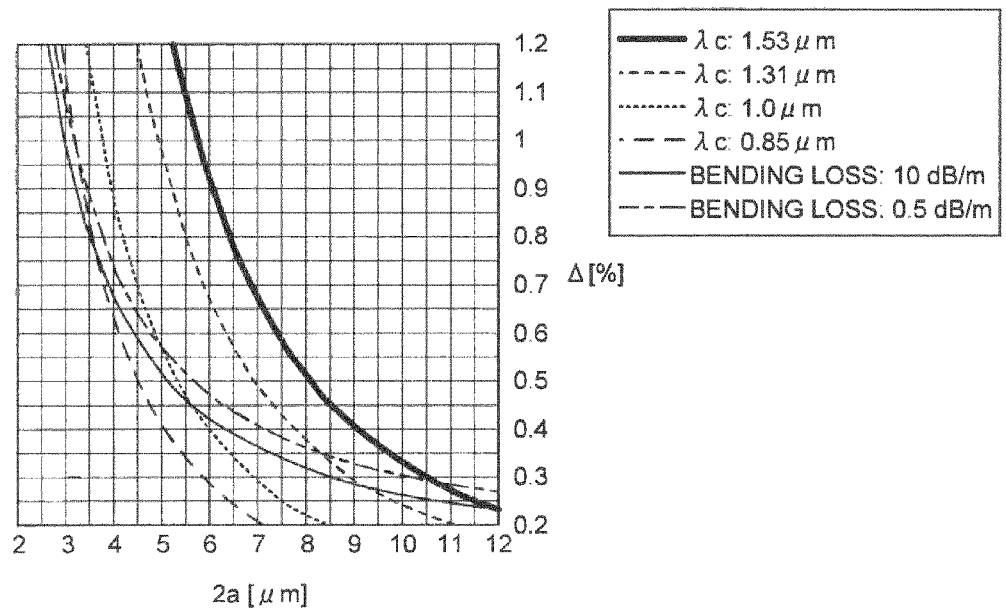
FIG. 4 is a graph of cut-off wavelengths and bending losses in relation to combinations of a core diameter and a relative refractive-index difference.

Next, cut-off wavelengths and bending losses in the case where the core diameter and the relative refractive-index difference have been set will be explained. FIG. 4 is a graph of cut-off wavelengths and bending losses at a wavelength of 1.55 micrometers, in relation to combinations of a core diameter and a relative refractive-index difference. In FIG. 4, for example, the bold solid line corresponding to "$\lambda_c$: 1.53 μm" represents combinations of a core diameter and a relative refractive-index difference that cause the cut-off wavelength to be 1.53 micrometers. As another example, the thin solid line corresponding to "the bending loss: 10 dB/m" represents combinations of a core diameter and a relative refractive-index difference that cause the bending loss at a wavelength of 1.55 micrometers to be 10 dB/m. As for the cut-off wavelengths, typical wavelengths that are used in an optical fiber transmission, namely, 1.53 micrometers, 1.31 micrometers, 1.0 micrometer, and 0.85 micrometer are shown. As for the bending losses, 10 dB/m, which is considered to be sufficient in practical use when an optical fiber is configured into a cable structure, as well as an even preferable value 0.5 dB/m are shown. As shown in FIG. 4, there is a tendency that, as an area gets closer to the lower left side in the graph (i.e., as the core diameter is configured so as to be smaller and the relative refractive-index difference is configured so as to be smaller), the cut-off wavelength becomes shorter. Further, there is a tendency that, as an area gets closer to the upper right side in the graph (i.e., as the core diameter is configured so as to be larger and the relative refractive-index difference is configured so as to be larger), the bending loss becomes smaller.

Figure 5:
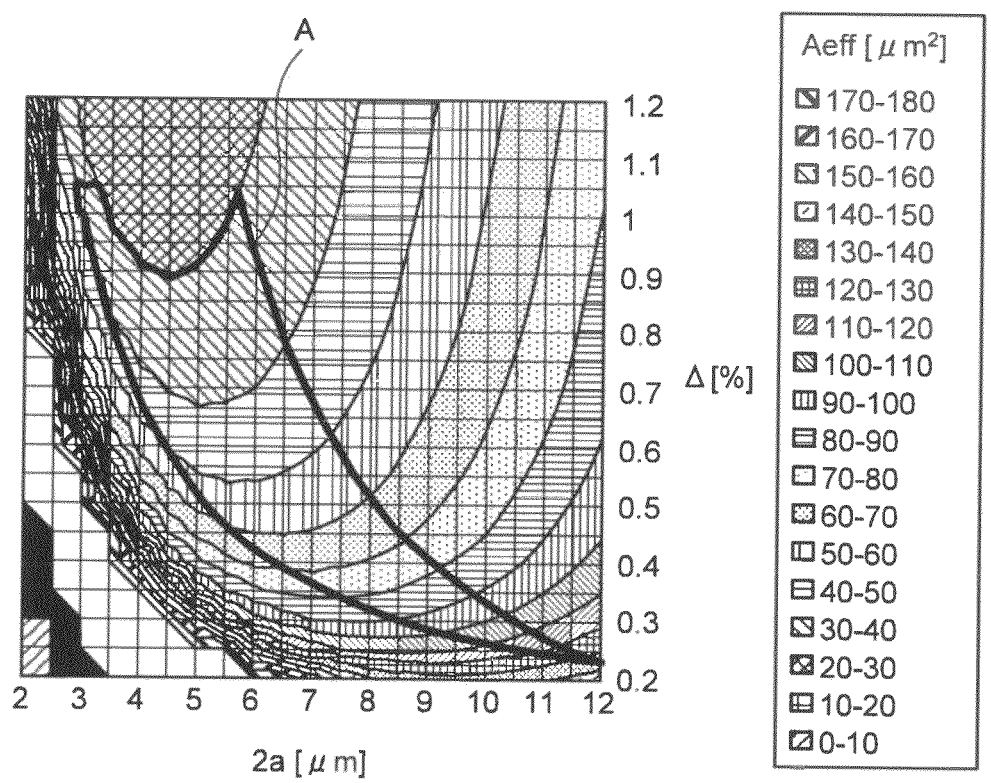
FIG. 5 is a graph that indicates, based on FIGS. 3 and 4, an area in which the cut-off wavelength is equal to or shorter than 1.53 micrometers, while the bending loss at a wavelength of 1.55 micrometers is equal to or smaller than 10 dB/m, whereas the effective core area at a wavelength of 1.55 micrometers is equal to or larger than 30 $\mu m^2$.

FIG. 5 is a graph that indicates, based on FIGS. 3 and 4, an area A in which the cut-off wavelength is equal to or shorter than 1.53 micrometers, while the bending loss at a wavelength of 1.55 micrometers is equal to or smaller than 10 dB/m, whereas the effective core area at a wavelength of 1.55 micrometers is equal to or larger than 30 μm². By selecting a combination of a core diameter and a relative refractive-index difference that is present in the area A shown in FIG. 5, it is possible to realize a cut-off wavelength, a bending loss, and an effective core area that are within the ranges mentioned above. Further, by selecting a combination of a core diameter and a relative refractive-index difference, it is possible to configure the cut-off wavelength so as to be 1.31 micrometers, 1.0 micrometer, or 0.85 micrometer, and to configure the bending loss so as to be equal to or smaller than 0.5 dB/m, which is even smaller than the example above.

It is possible to approximately express the area A shown in FIG. 5 by using the following expressions:

$$\Delta \leq 1.05;$$

$$\Delta \leq 0.096134 \times (2a)^2 - 0.86034 \times (2a) + 2.8176;$$

$$\Delta \leq 0.00049736 \times (2a)^4 - 0.021060 \times (2a)^3 + 0.34024 \times (2a)^2 - 2.5446 \times (2a) + 7.8409; \text{ and}$$

$$\Delta \leq 1.6505 \times 10^{-5} \times (2a)^6 - 0.00081767 \times (2a)^5 + 0.016634 \times (2a)^4 - 0.17873 \times (2a)^3 + 1.0822 \times (2a)^2 - 3.6021 \times (2a) + 5.7132$$

Accordingly, by selecting a combination of a core diameter $2a$ and a relative refractive-index difference Δ that satisfies the expressions shown above, it is possible to realize a cut-off wavelength, a bending loss, and an effective core area that are within the ranges mentioned above.

Next, with respect to two core portions having a combination of a core diameter and a relative refractive-index difference that have been selected in the manner described above, calculations have been performed so as to find interval distances between the core portions that cause the cross-talk of the light between the core portions to be −35 decibels at a wavelength of 1.55 micrometers, in the case where the total length of the multi-core optical fiber has been set. In the following sections, such interval distances between the core portions that cause the cross-talk of the light between the core portions to be −35 decibels at a wavelength of 1.55 micrometers will be referred to as "core pitches".

FIG. 6 is a table in which various optical characteristics of multi-core optical fibers including two core portions and core pitches with respect to predetermined total lengths are shown as calculation examples 1 to 15, in correspondence with a situation in which the combinations of a core diameter and a relative refractive-index difference within the area A shown in FIG. 5 have been selected. In FIG. 6, "$\lambda_c$" denotes the cut-off wavelength, whereas "Aeff" denotes the effective core area at a wavelength of 1.55 micrometers. Also, in FIG. 6, the values of wavelength dispersion and dispersion slope are values at a wavelength of 1.55 micrometers. Further, as examples of the total length of the multi-core optical fiber, 1 meter, 10 meters, 100 meters, 1 kilometers, 10 kilometers, and 100 kilometers are used.

Because the core diameter $2a$ is equal to or smaller than 12 micrometers, while the relative refractive-index difference $\Delta$ is equal to or larger than 0.2% in each of all of calculation examples 1 to 15 shown in FIG. 6, the characteristics where the cut-off wavelength is equal to or shorter than 1.53 micrometers, whereas, at a wavelength of 1.55 micrometers, the bending loss is equal to or smaller than 10 dB/m while the effective core area is equal to or larger than 30 $\mu m^2$ are realized.

Further, by configuring the interval distance between the core portions so as to have a value that is equal to or larger than the core pitch with respect to a predetermined total length, it is possible to configure the cross-talk of the light between the core portions so as to be equal to or smaller than −35 decibels at a wavelength of 1.55 micrometers. For example, in calculation example 1, in the case where the total length is 1 meter, the core pitch is 46.5 micrometers. Thus, by configuring the interval distance between the core portions so as to be equal to or longer than 46.5 micrometers, it is possible to configure the cross-talk between the core portions so as to be equal to or smaller than −35 decibels. As another example, in the case where the total length is 100 kilometers, the core pitch is 86.4 micrometers. Thus, by configuring the interval distance between the core portions so as to be equal to or longer than 86.4 micrometers, it is possible to configure the cross-talk between the core portions so as to be equal to or smaller than −35 decibels.

Further, by configuring the core diameter $2a$ so as to be equal to or larger than 9.5 micrometers and configuring the relative refractive-index difference $\Delta$ so as to be 0.3%, it is possible to configure the effective core area Aeff so as to be equal to or larger than 100 $\mu m^2$, and it is therefore possible to further reduce optical non-linearity. In this situation, by configuring the interval distance between the core portions so as to be equal to or longer than 44 micrometers in accordance with the total length, it is possible to configure the cross-talk between the core portions so as to be equal to or smaller than −35 decibels.

For example, in calculation example 4, the core diameter $2a$ is 11.72 micrometers, which is larger than 9.5 micrometers, whereas the relative refractive-index difference $\Delta$ is 0.238%, which is smaller than 0.3%. Thus, the effective core area Aeff is 129.8 $\mu m^2$, which is larger than 100 $\mu m^2$. Further, in accordance with the total length that is equal to or longer than 1 meter, by configuring the interval distance between the core portions so as to be equal to or longer than 48.3 micrometers, which is longer than 44 micrometers, it is possible to configure the cross-talk between the core portions so as to be equal to or smaller than −35 decibels.

As another example, in calculation example 9 also, the core diameter $2a$ is 9.5 micrometers, whereas the relative refractive-index difference $\Delta$ is 0.280%, which is smaller than 0.3%. Thus, the effective core area Aeff is 100.9 $\mu m^2$, which is larger than 100 $\mu m^2$. Further, in accordance with the total length that is equal to or longer than 1 meter, by configuring the interval distance between the core portions so as to be equal to or longer than 47.3 micrometers, which is longer than 44 micrometers, it is possible to configure the cross-talk between the core portions so as to be equal to or smaller than −35 decibels.

As yet another example, in calculation example 11, the effective core area Aeff is 31.0 $\mu m^2$, which is larger than 30 $\mu m^2$. Further, in accordance with the total length that is equal to or longer than 1 meter, by configuring the interval distance between the core portions so as to be equal to or longer than 27 micrometers, it is possible to configure the cross-talk between the core portions so as to be equal to or smaller than −35 decibels. As explained here, in the multi-core optical fiber according to an aspect of the present invention, it is preferable to configure the interval distance between the core portions so as to be equal to or longer than 27 micrometers, in accordance with the total length that is equal to or longer than 1 meter.

Further, in calculation example 12, the core diameter $2a$ is 10.5 micrometers, which is larger than 9.5 micrometers, whereas the relative refractive-index difference $\Delta$ is 0.296%, which is smaller than 0.3%. Thus, the effective core area Aeff thereof is 104.3 $\mu m^2$, which is larger than 100 $\mu m^2$. Further, in accordance with the total length that is equal to or longer than 1 meter, by configuring the interval distance between the core portions so as to be equal to or longer than 44 micrometers, it is possible to configure the cross-talk between the core portions so as to be equal to or smaller than −35 decibels.

Furthermore, in calculation examples 10, 11, 13, and 14, the core diameter $2a$ is equal to or smaller than 8.5 micrometers, whereas the relative refractive-index difference $\Delta$ is equal to or larger than 0.4%. In this situation, the core pitch is equal to or shorter than 40 micrometers with respect to the predetermined total length. As a result, it is possible to configure the interval distance between the core portions so as to be as small as a value equal to or shorter than 40 micrometers. Thus, it is possible to arrange the core portions with a high density.

Further, in calculation example 15, by configuring the core diameter $2a$ so as to be 3 micrometers and configuring the relative refractive-index difference $\Delta$ so as to be equal to or smaller than 0.980%, a desired cut-off wavelength, a desired effective core area, and a desired bending loss are realized.

As for the values of the wavelength dispersion and the dispersion slope, the values fall in a range that has no problem in practical use, in each of all of calculation examples 1 to 15.

As shown in calculation examples 1 to 15 explained above, when the multi-core optical fiber according to an aspect of the present invention is used, in the case where the number of the core portions is two, it is possible to realize the characteristics where the cut-off wavelength is equal to or shorter than 1.53 micrometers, whereas, at a wavelength of 1.55 micrometers, the bending loss is equal to or smaller than 10 dB/m while the effective core area is equal to or larger than 30 $\mu m^2$, and the cross-talk of the light between the core portions with respect to the predetermined total length is equal to or smaller than −35 decibels at a wavelength of 1.55 micrometers.

Next, a second embodiment of the present invention will be explained. In a multi-core optical fiber according to the second embodiment, the number of the core portions is seven.

Figure 7:
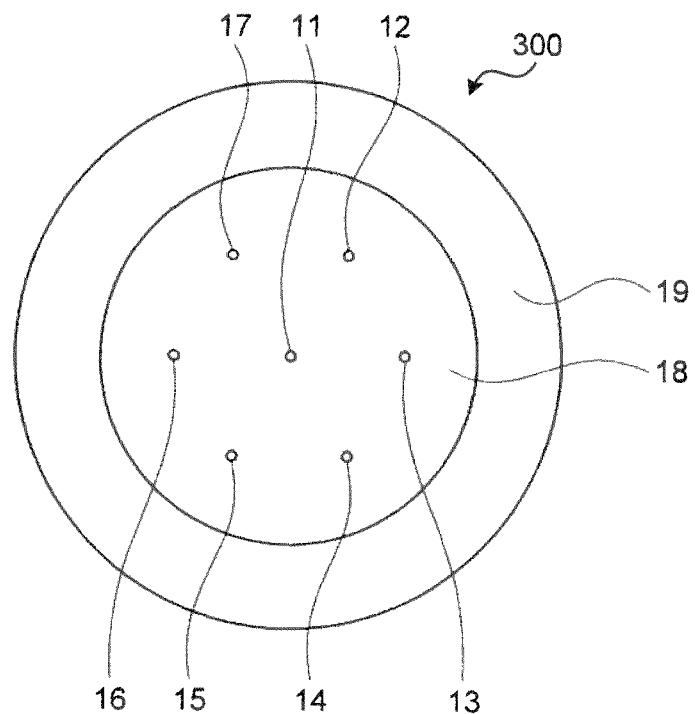
FIG. 7 is a schematic cross-sectional view of a multi-core optical fiber according to a second embodiment of the present invention.

FIG. 7 is a schematic cross-sectional view of a multi-core optical fiber according to the second embodiment. As shown in FIG. 7, a multi-core optical fiber 300 includes seven core portions (i.e., core portions 11 to 17), a cladding portion 18 that is positioned so as to surround the outside of the core portions 11 to 17, and a coating portion 19 that is formed so as to surround the outside of the cladding portion 18. The core portion 11 is positioned near the central axis of the multi-core optical fiber 300, whereas the other core portions 12 to 17 are arranged so as to be positioned at apexes of a substantially-regular hexagon. Also, the interval distances between the core portion 11 and a different one of the core portions 12 to 17 are all equal and are each 84.6 micrometers. These interval distances will be explained in detail later.

Further, like in the example with the multi-core optical fiber 100 according to the first embodiment, each of the core portions 11 to 17 and the cladding portion 18 is made from, for example, silica-based glass. The cladding portion 18 has a lower refractive index than the refractive index of each of the core portions 11 to 17. As refractive index profiles of the core portions 11 to 17, a step-index type is used.

Further, like in the example with the multi-core optical fiber 100, the core diameter of each of the core portions 11 to 17 is 3.55 micrometers. The relative refractive-index difference of each of the core portions 11 to 17 is 0.783%. The relative refractive-index differences and the core diameters are defined in the same manner as with the multi-core optical fiber 100 according to the first embodiment. As a result, the multi-core optical fiber 300 is configured so that, with respect to the core portions 11 to 17, the cut-off wavelength is 0.85 micrometer, which is shorter than 1.53 micrometers, whereas the bending loss at a wavelength of 1.55 micrometers is 10 dB/m, while the effective core area at a wavelength of 1.55 micrometers is 43.2 $\mu m^2$. Accordingly, the multi-core optical fiber 300 is able to transmit in a single mode, throughout a large wavelength bandwidth that is equal to or longer than 0.85 micrometer, optical signals having a wavelength within the bandwidth. In addition, the bending loss to be caused in the case where the multi-core optical fiber 300 is configured into a cable structure exhibits a value that is suitable for practical use. Further, the multi-core optical fiber 300 is an optical fiber that has a sufficiently low optical non-linearity. Thus, the multi-core optical fiber 300 is suitable for a large-capacity optical transmission.

The multi-core optical fiber 300 is configured so that the core diameter and the relative refractive-index difference of each of the core portions 11 to 17 have the same values as in the example with the multi-core optical fiber 100. Thus, the cut-off wavelength, the bending loss, and the effective core area with respect to the core portions 11 to 17 also have the same values as in the example with the multi-core optical fiber 100. The reason is that these optical characteristics are determined by the core diameters and the relative refractive-index differences of the core portions 11 to 17.

In contrast, the multi-core optical fiber 300 is configured so that the number of the core portions that are positioned adjacent to any given core portion (hereinafter, "adjacent core portions") is larger than that in the example with the multi-core optical fiber 100. For example, with regard to the core portion 11, the core portions 12 to 17 are positioned adjacent thereto, and the number of adjacent core portions of the core portion 11 is therefore six. With regard to each of the core portions 12 to 17, the number of adjacent core portions is three, because the other three core portions have a longer interval distance from the core portion in question than the three adjacent core portions do. In this situation, because the cross-talk between the core portions drastically becomes smaller as the interval distance becomes longer, it is necessary to consider only the cross-talk between each of the core portions and the adjacent core portions thereof.

For this reason, with respect to the multi-core optical fiber 300, the interval distance between core portions that are positioned adjacent to each other is set by taking into consideration the cross-talk with respect to the core portion 11, which has the largest number of adjacent core portions and thus has the largest cross-talk. More specifically, the multi-core optical fiber 300 is configured so that the interval distance between the core portion 11 and each of the core portions 12 to 17 is set to 84.6 micrometers, as described above. As a result, the cross-talk of the light between the core portions in the case where the total length is equal to or longer than 10 kilometers is equal to or smaller than −35 decibels at a wavelength of 1.55 micrometers. Accordingly, with respect to the core portion 11, the cross-talk of the optical signals that are individually transmitted through the core portions 11 to 17 is sufficiently small. In addition, as for the cross-talk with respect to each of the other core portions 12 to 17, the cross-talk is surely equal to or smaller than −35 decibels, because the cross-talk should be smaller than the cross-talk with respect to the core portion 11.

Figure 8:
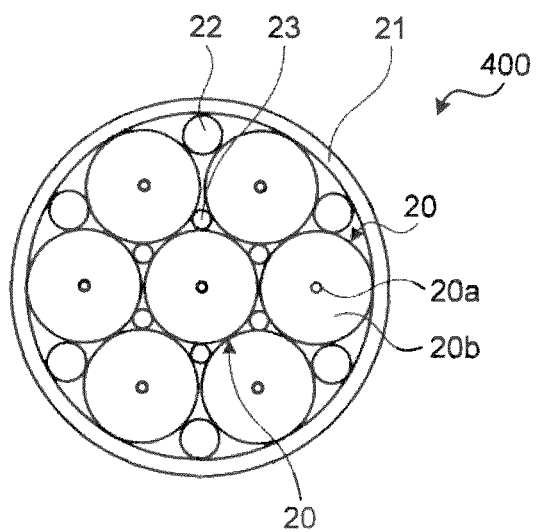
FIG. 8 is a drawing for explaining an example of a method for manufacturing the multi-core optical fiber shown in FIG. 7.

It is also possible to manufacture the multi-core optical fiber 300 without the necessity of precise pressure control, unlike in an example with a hole-structure optical fiber. Thus, the multi-core optical fiber 300 has high productivity. FIG. 8 is a drawing for explaining an example of a method for manufacturing the multi-core optical fiber 300 shown in FIG. 7. As shown in FIG. 8, according to this manufacturing method, first, seven capillaries 20 are disposed in a glass tube 21 that is made from the same material as the material of which the cladding portion 18 is made. Each of the capillaries 20 has a core region 20a for forming a different one of the core portions 11 to 17 and a cladding region 20b for forming the cladding portion 18. After that, the space within the glass tube 21 is filled with filling capillaries 22 and 23 each of which is made of the same material as the material of which the cladding portion 18 is made, so as to manufacture an optical fiber preform 400. Alternatively, the space may be filled with glass powder instead of the filling capillaries 22 and 23. Subsequently, an optical fiber is drawn from the optical fiber preform 400 while maintaining an outside diameter of the optical fiber that has been calculated so as to realize a predetermined core diameter and a predetermined interval distance between the core portions. As a result, it is possible to manufacture the multi-core optical fiber 300 shown in FIG. 7 without the necessity of precise pressure control.

As explained above, the multi-core optical fiber 300 according to the second embodiment is a multi-core optical fiber that has high productivity and is suitable for a large-capacity optical transmission.

Next, like in the example above with the multi-core optical fiber of which the number of the core portions is two, the multi-core optical fiber according to an aspect of the present invention in which seven core portions are provided like the multi-core optical fiber 300 shown in FIG. 7 will be explained more specifically, through calculations that use FEM simulations.

First, as for the combination of a core diameter and a relative refractive-index difference with respect to each of the core portions, like in the example in which the number of the core portions is two, by selecting a combination of a core diameter and a relative refractive-index difference that is present in the area A shown in FIG. 5, it is possible to configure the cut-off wavelength so as to be equal to or shorter than 1.53 micrometers, to configure the bending loss at a wavelength of 1.55 micrometers so as to be equal to or smaller than 10 dB/m, and to configure the effective core area at a wavelength of 1.55 micrometers so as to be equal to or larger than 30 $\mu m^2$.

Next, with respect to a multi-core optical fiber which has seven core portions having a combination of a core diameter and a relative refractive-index difference that have been selected in the manner described above, calculations have been performed so as to find the interval distances between the core portions (i.e., the core pitches) that cause the cross-talk of the light with respect to the core portion corresponding to the core portion 11 shown in FIG. 7 to be −35 decibels at a wavelength of 1.55 micrometers, in the case where the total length of the multi-core optical fiber has been set.

FIG. 9 is a table in which various optical characteristics of multi-core optical fibers including seven core portions and core pitches with respect to predetermined total lengths are shown as calculation examples 16 to 30, in correspondence with a situation in which one of the combinations of a core diameter and a relative refractive-index difference within the area A shown in FIG. 5 has been selected. The values of the core diameters $2a$ and the relative refractive-index differences $\Delta$ in calculation examples 16 to 30 are the same as the values in calculation examples 1 to 15 shown in FIG. 6, respectively. Thus, the values of the cut-off wavelength $\lambda c$, the effective core area Aeff, the wavelength dispersion, and the dispersion slope are also the same as the values in calculation examples 1 to 15. Only the core pitches are different from the core pitches in calculation examples 1 to 15.

More specifically, in each of calculation examples 16 to 30 shown in FIG. 9, the core diameter $2a$ is equal to or smaller than 12 micrometers, whereas the relative refractive-index difference $\Delta$ is equal to or larger than 0.2%. Thus, the characteristics where the cut-off wavelength is equal to or shorter than 1.53 micrometers, whereas, at a wavelength of 1.55 micrometers, the bending loss is equal to or smaller than 10 dB/m while the effective core area is equal to or larger than 30 $\mu m^2$ are realized.

Further, for instance, in calculation example 16, in the case where the total length is 1 meter, the core pitch is 52.7 micrometers. Thus, by configuring the interval distance between the core portions so as to be equal to or longer than 52.7 micrometers, it is possible to configure the cross-talk between the core portions so as to be equal to or smaller than −35 decibels. As another example, in the case where the total length is 100 kilometers, the core pitch is 92.6 micrometers. Thus, by configuring the interval distance between the core portions so as to be equal to or longer than 92.6 micrometers, it is possible to configure the cross-talk between the core portions so as to be equal to or smaller than −35 decibels.

Further, by configuring the core diameter $2a$ so as to be equal to or larger than 9.5 micrometers and configuring the relative refractive-index difference $\Delta$ so as to be 0.3%, it is possible to configure the effective core area Aeff so as to be equal to or larger than 100 $\mu m^2$, and it is therefore possible to further reduce optical non-linearity. In this situation, by configuring the interval distance between the core portions so as to be equal to or longer than 49 micrometers in accordance with the total length, it is possible to configure the cross-talk between the core portions so as to be equal to or smaller than −35 decibels.

For example, in calculation example 19, the core diameter $2a$ is 11.72 micrometers, which is larger than 9.5 micrometers, whereas the relative refractive-index difference $\Delta$ is 0.238%, which is smaller than 0.3%. Thus, the effective core area Aeff is 129.8 $\mu m^2$, which is larger than 100 $\mu m^2$. Further, in accordance with the total length that is equal to or longer than 1 meter, by configuring the interval distance between the core portions so as to be equal to or longer than 54.3 micrometers, which is longer than 49 micrometers, it is possible to configure the cross-talk between the core portions so as to be equal to or smaller than −35 decibels.

As another example, in calculation example 24 also, the core diameter $2a$ is 9.5 micrometers, whereas the relative refractive-index difference $\Delta$ is 0.280%, which is smaller than 0.3%. Thus, the effective core area Aeff is 100.9 $\mu m^2$, which is larger than 100 $\mu m^2$. Further, in accordance with the total length that is equal to or longer than 1 meter, by configuring the interval distance between the core portions so as to be equal to or longer than 53.2 micrometers, which is longer than 49 micrometers, it is possible to configure the cross-talk between the core portions so as to be equal to or smaller than −35 decibels.

As yet another example, in calculation example 26, the effective core area Aeff is 31.0 $\mu m^2$, which is larger than 30 $\mu m^2$. Further, in accordance with the total length that is equal to or longer than 1 meter, by configuring the interval distance between the core portions so as to be equal to or longer than 30 micrometers, it is possible to configure the cross-talk between the core portions so as to be equal to or smaller than −35 decibels. As explained here, in the multi-core optical fiber according to an aspect of the present invention, in the case where the number of the core portions is seven, it is necessary to configure the interval distance between the core portions so as to be equal to or longer than 30 micrometers, in accordance with the total length that is equal to or longer than 1 meter.

Further, in calculation example 27, the core diameter $2a$ is 10.5 micrometers, which is larger than 9.5 micrometers, whereas the relative refractive-index difference $\Delta$ is 0.296%, which is smaller than 0.3%. Thus, the effective core area Aeff is 104.3 $\mu m^2$, which is larger than 100 $\mu m^2$. Further, in accordance with the total length that is equal to or longer than 1 meter, by configuring the interval distance between the core portions so as to be equal to or longer than 49 micrometers, it is possible to configure the cross-talk between the core portions so as to be equal to or smaller than −35 decibels.

Furthermore, in calculation examples 25, 26, 28, and 29, the core diameter $2a$ is equal to or smaller than 8.5 micrometers, whereas the relative refractive-index difference $\Delta$ is equal to or larger than 0.4%. In this situation, the core pitch is equal to or shorter than 40 micrometers in accordance with the predetermined total lengths. Accordingly, because it is possible to configure the interval distance between the core portions so as to be as small as a value equal to or shorter than 40 micrometers, it is possible to arrange the core portions with a high density. In addition, in the case where the interval distance between the core portions is equal to or shorter than 40 micrometers, even if the outside diameter of the cladding portion of the multi-core optical fiber is configured so as to be 125 micrometers, which is the same value as that in a standard single-mode optical fiber, it is still possible to have the seven core portions contained therein. Thus, this arrangement is preferable in terms of compatibility with standard single-mode optical fibers.

Further, in calculation example 30, by configuring the core diameter $2a$ so as to be 3 micrometers and configuring the relative refractive-index difference $\Delta$ so as to be equal to or smaller than 0.980%, a desired cut-off wavelength, a desired effective core area, and a desired bending loss are realized.

As shown in calculation examples 16 to 30 explained above, when the multi-core optical fiber according to an aspect of the present invention is used, in the case where the number of the core portions is seven, it is possible to realize the characteristics where the cut-off wavelength is equal to or shorter than 1.53 micrometers, whereas, at a wavelength of 1.55 micrometers, the bending loss is equal to or smaller than 10 dB/m while the effective core area is equal to or larger than 30 $\mu m^2$, and the cross-talk of the light between the core portions with respect to the predetermined total length is equal to or smaller than −35 decibels at a wavelength of 1.55 micrometers.

Next, five different types of single-mode optical fibers each of which includes a single core portion (hereinafter, "single-core SMFs") were manufactured so as to measure microbending loss characteristics thereof. In each of the single-core SMFs, the core diameter is approximately 10 micrometers, whereas the relative refractive-index difference of the core portion with respect to the cladding portion is approximately 0.3%. The outside diameter of the cladding portion is different for each of the single-core SMFs. In all of these optical fibers, the coating has a thickness of 62.5 micrometers, which is the same thickness as coating in a conventional single-core SMF. Further, the microbending loss is defined as the difference between (a) a transmission loss that is measured when the optical fiber is wound around a bobbin of which the surface is wrapped with a piece of 1000-count sand paper and (b) a transmission loss that is measured when the optical fiber is unwound from the bobbin and is rolled up in a bundle (see the International Electrotechnical Commission [IEC] Technical Report [TR] 62221, Method B).

Figure 10:
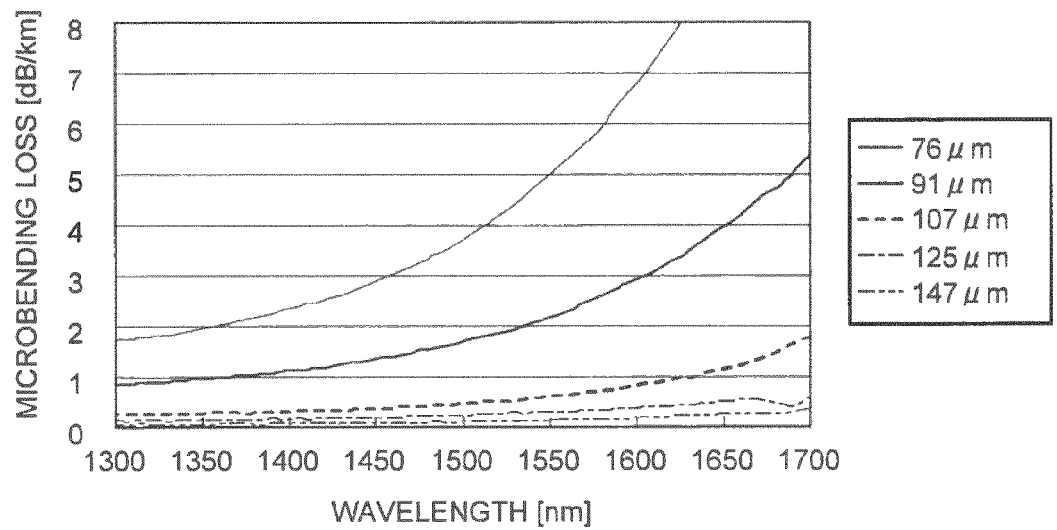
FIG. 10 is a graph of microbending loss spectra of single-core Single Mode Fibers (SMFs) of which the outside diameters of the cladding portions are 147 micrometers, 125 micrometers, 107 micrometers, 91 micrometers, and 76 micrometers, respectively.
Figure 11:
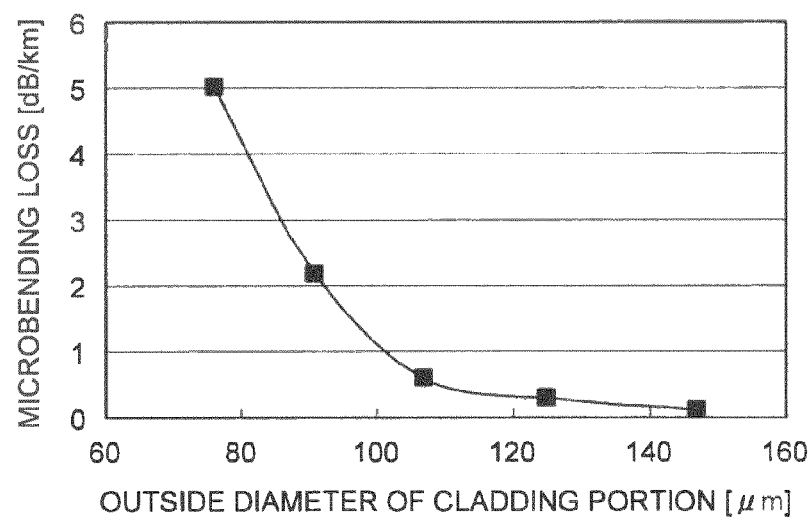
FIG. 11 is a graph of a relationship between the outside diameters of the cladding portions and microbending losses at a wavelength of 1550 nanometers.

FIG. 10 is a graph of microbending loss spectra of the single-core SMFs of which the outside diameters of the cladding portions are 147 micrometers, 125 micrometers, 107 micrometers, 91 micrometers, and 76 micrometers, respectively. FIG. 11 is a graph of a relationship between the outside diameters of the cladding portions and the microbending losses at a wavelength of 1550 nanometers. As shown in FIGS. 10 and 11, as the outside diameter of a cladding portion becomes smaller, the microbending loss increases in an exponential manner. In particular, in the case where the outside diameter of a cladding portion is 100 micrometers or smaller, the microbending loss drastically increases. Accordingly, to inhibit the microbending loss for a single-core SMF, it is desirable to configure the outside diameter of the cladding portion so as to be equal to or larger than 100 micrometers, which means to configure the outside radius so as to be equal to or larger than 50 micrometers. Further, for a multi-core optical fiber including core portions having the same characteristics (i.e., the core diameter and the relative refractive-index difference) as the core portion in the single-core SMF, it is desirable to configure the shortest distance between the center of one of the core portions that is positioned closest to the outer circumference of the cladding portion and the outer circumference of the cladding portion so as to be equal to or longer than 50 micrometers.

Figure 12:
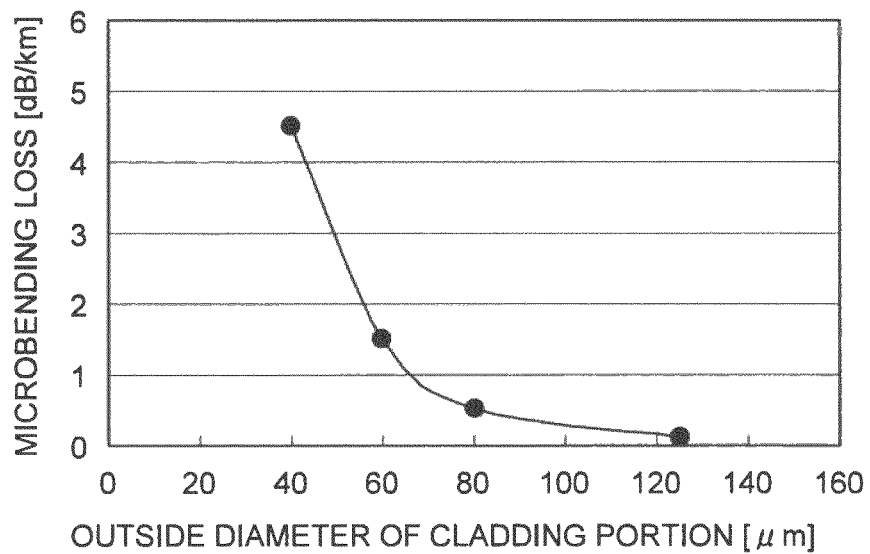
FIG. 12 is a graph of a result of estimating a relationship between the outside diameters of a cladding portion and microbending losses at a wavelength of 1550 nanometers, with respect to a single-core SMF including a core portion that has the same characteristics as the core portions in the multi-core optical fiber shown as calculation example 26 in FIG. 9.

FIG. 12 is a graph of a result of estimating a relationship between the outside diameters of a cladding portion and microbending losses at a wavelength of 1550 nanometers, with respect to a single-core optical fiber including a core portion that has the same characteristics as the core portions in the multi-core optical fiber shown as calculation example 26 in FIG. 9. As shown in FIG. 12, in the case where, in particular, the outside diameter of the cladding portion is equal to or smaller than 60 micrometers, the microbending loss increases drastically. Accordingly, for a multi-core optical fiber including core portions having the same characteristics as the core portions in the multi-core optical fiber shown as calculation example 26, to inhibit microbending losses, it is desirable to configure the shortest distance between the center of one of the core portions that is positioned closest to the outer circumference of the cladding portion and the outer circumference of the cladding portion so as to be equal to or longer than 30 micrometers.

Figure 13:
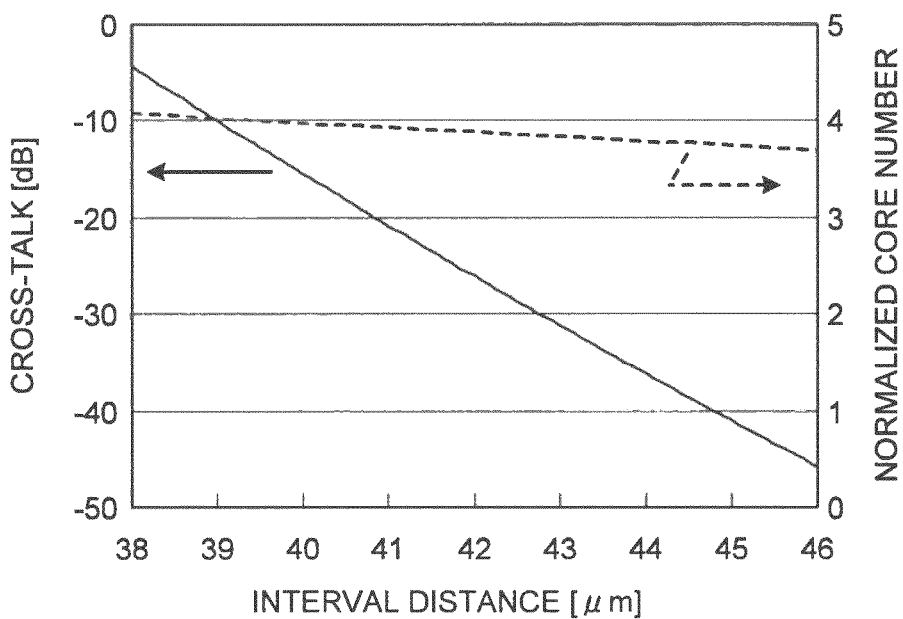
FIG. 13 is a graph that shows, with respect to a multi-core optical fiber, a relationship between interval distances of the core portions and cross-talk as well as normalized core numbers, at a wavelength of 1550 nanometers in the situation where the total length of the multi-core optical fiber is 100 kilometers.

FIG. 13 is a graph that shows, with respect to a multi-core optical fiber, a relationship between interval distances of the core portions and cross-talk as well as normalized core numbers, at a wavelength of 1550 nanometers in the situation where the total length of the multi-core optical fiber is 100 kilometers. The core diameter of each of the core portions is 10.4 micrometers, whereas the relative refractive-index difference is 0.31%. The normalized core number has been normalized so that the value of the normalized core number is 1 for a single-core SMF of which the outside diameter of the cladding portion is 125 micrometers. As shown in FIG. 13, when the interval distance between the core portions is configured so as to be longer, for example, is changed from 40 micrometers to 45 micrometers, the cross-talk is significantly reduced from −15 decibels to −40 decibels, while the normalized core number changes only slightly from 3.98 to 3.74. In other words, even considering the fact that the effect caused by arranging the core portions with a high density becomes smaller, it is desirable to configure the interval distances so as to be longer for the purpose of reducing cross-talk.

Multi-core optical fibers in which seven core portions are provided were actually manufactured as embodiment examples 1 to 3 according to the present invention. More specifically, first, a glass preform was manufactured by, in a glass tube that is made from pure silica, disposing capillaries so as to form a regular hexagon, and also, disposing another capillary at the center of the regular hexagon, and further filling the space between the glass tube and the capillaries with a large number of filling capillaries each of which is solid (i.e., not hollow) and is made from pure-silica glass, each of the capillaries including: a core portion of which the diameter is approximately 10 millimeters and which had been doped with germanium so that the relative refractive-index difference with respect to pure silica was 0.34%; and a cladding portion that was formed so as to surround the core portion and so as to have a thickness approximately four times larger than the diameter of the core portion. The diameter of the glass preform (i.e., the diameter of the glass tube made of pure silica) is 47 millimeters in each of embodiment examples 1 to 3.

When the space was filled with the filling capillaries, markers for identifying the positions of the core portions were prepared by replacing some of the filling capillaries in certain positions with capillaries each of which is hollow and is made from pure-silica glass. After that, the multi-core optical fibers serving as embodiment examples 1 to 3 were drawn from the glass preform. In the manufactured multi-core optical fibers, the outside diameter of the cladding portion was 204.0 micrometers in embodiment example 1, was 209.9 micrometers in embodiment example 2, and was 238.4 micrometers in embodiment example 3. The coating was formed so as to have a thickness of approximately 62.5 micrometers in embodiment examples 1 and 2 and a thickness of approximately 70 micrometers in embodiment example 3.

Figure 14:
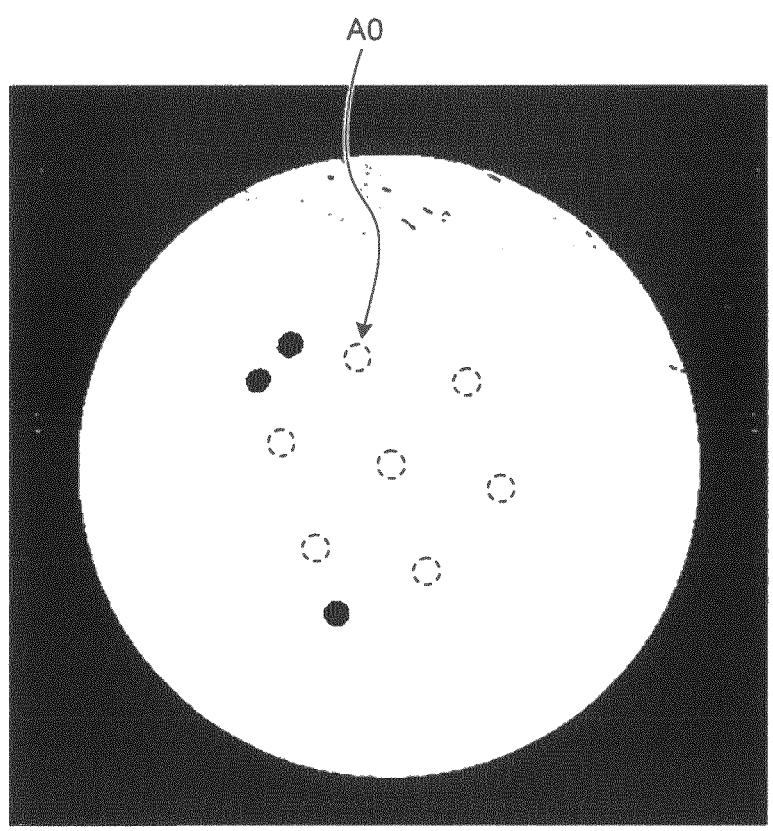
FIG. 14 is a schematic drawing of a cross section of a multi-core optical fiber according to embodiment example 1.

FIG. 14 is a schematic drawing of a cross section of the multi-core optical fiber according to embodiment example 1. In FIG. 14, the circular areas defined by the broken lines indicate the positions of the core portions. The reference symbol A0 denotes one of the core portions. The filled circles indicate the markers. As shown in FIG. 14, the multi-core optical fiber according to embodiment example 1 is configured so that it is possible to identify certain circumferential direction of the cladding portion by using the markers so that it is possible to identify the position of each of the core portions with higher certainty. Embodiment examples 2 and 3 are the same as embodiment example 1 except for interval distances or the like, and therefore, have similar cross-sectional structures as the one shown in FIG. 14. In the following sections, of the core portions in the multi-core optical fiber according to embodiment example 2, the core portion that is in the position corresponding to the position of the core portion A0 in embodiment example 1 shown in FIG. 14 will also be referred to as a core portion A0. As for the core portions in the multi-core optical fiber according to embodiment example 3, a central core portion is referred to as a core portion A4, and surrounding core portions are referred to as B4, C4, D4, E4, F4, and G4 in a clockwise direction starting from one closest to the bottom-left marker.

Next, the core diameters, the relative refractive-index differences of the multi-core optical fibers according to embodiment examples 1 to 3, as well as the optical characteristics of these core portions will be explained. FIG. 15A is a table showing the optical characteristics of the core portions A0 in the multi-core optical fibers according to embodiment examples 1 and 2. In this situation, the values of the transmission loss and Aeff are values at a wavelength of 1.55 micrometers. The core diameter of each of the core portions was configured so as to be 8.3 micrometers. The relative refractive-index difference of each of the core portions with respect to the cladding portion was configured so as to be 0.34%. Further, the bending losses at a wavelength of 1.55 micrometers were both equal to or smaller than 10 dB/m.

FIG. 15B is a table showing the optical characteristics of the core portions A4 to G4 in the multi-core optical fibers according to embodiment example 3. "MFD" indicates a mode field diameter. The values of MFD, bending loss, transmission loss, Aeff, wavelength dispersion, and dispersion slope are values at a wavelength of 1.55 micrometers. The core diameter of each of the core portions was set to 9.1 micrometers, and the relative refractive-index difference of each core portion with respect to the cladding portion was set to 0.34%. However, a difference in characteristics may occur between the core portions in manufacturing processes. Each bending loss at a wavelength of 1.55 micrometers was 10 db/m or smaller.

Figure 16A:
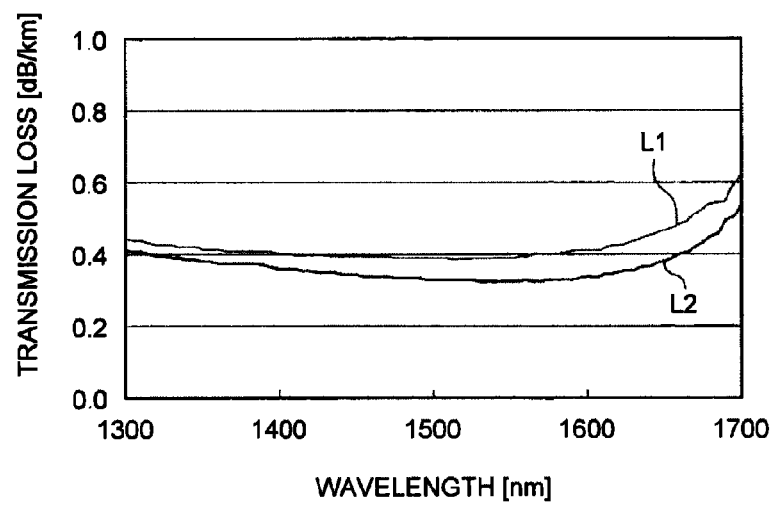
FIG. 16A is a graph of transmission loss spectra of the core portions in the multi-core optical fibers according to embodiment examples 1 and 2.

FIG. 16A is a graph of transmission loss spectra of the core portions A0 in the multi-core optical fibers according to embodiment examples 1 and 2. In FIG. 16A, the line L1 indicates the spectrum of the core portion A0 in embodiment example 1, whereas the line L2 indicates the spectrum of the core portion A0 in embodiment example 2. As shown with the lines L1 and L2, no significant increase in the transmission loss was observed in the wavelength range from 1300 nanometers to 1700 nanometers inclusive. It should be noted, however, that when embodiment examples 1 and 2 are compared with each other, embodiment example 1 having a shorter core pitch exhibited a slightly larger transmission loss. The cause of this phenomenon is considered to be a decrease in the optical power due to interference of the light between the core portions. Thus, to further inhibit the transmission loss, it is desirable to configure the interval distance so as to be equal to or longer than 47.5 micrometers.

Figure 16B:
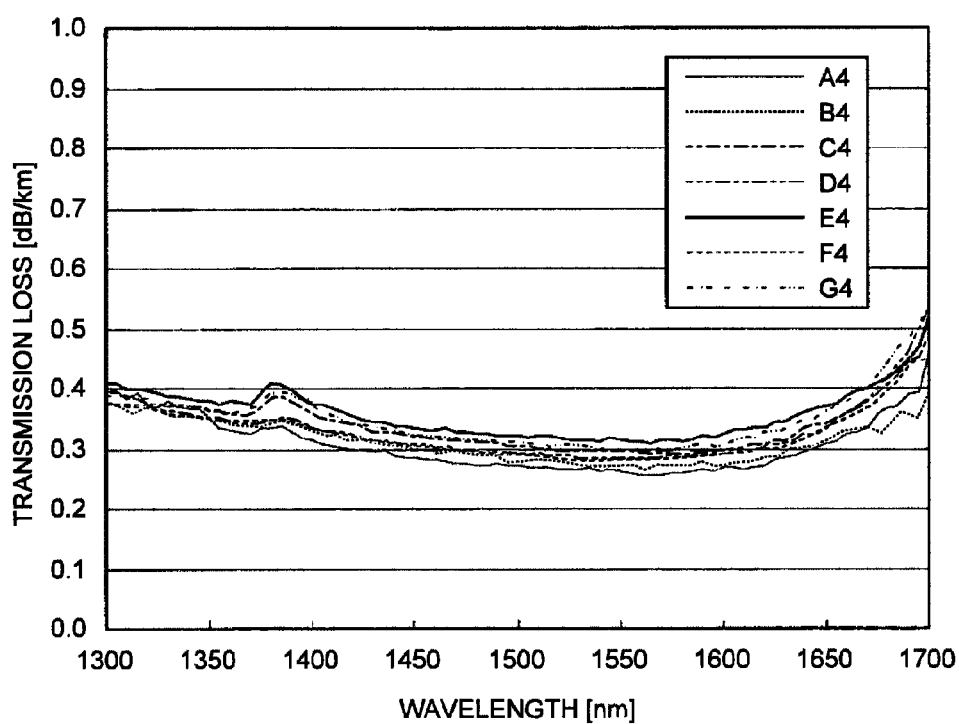
FIG. 16B is a graph of transmission loss spectra of the core portions in the multi-core optical fibers according to embodiment example 3.

FIG. 16B is a graph of transmission loss spectra of the core portions A4 to G4 in the multi-core optical fibers according to embodiment example 3. Even in the multi-core optical fibers of embodiment example 3, no significant increase in the transmission loss was observed in the wavelength range from 1300 nanometers to 1700 nanometers inclusive.

Figure 17:
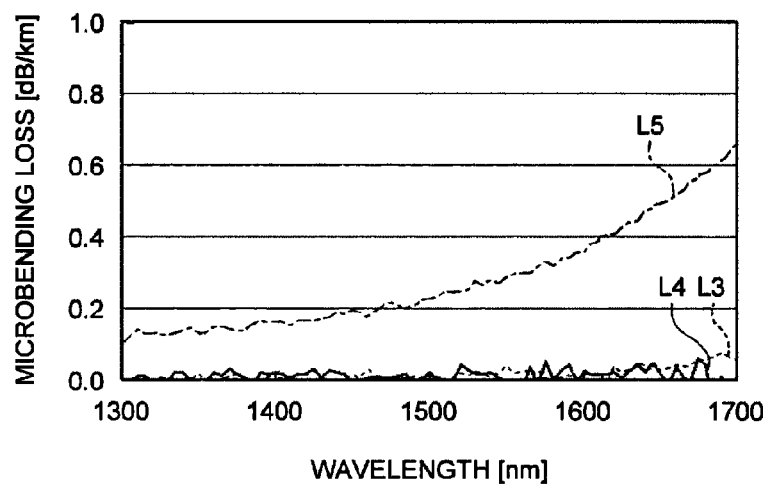
FIG. 17 is a graph of microbending loss spectra of the multi-core optical fibers according to embodiment examples 1 and 2.

Next, the microbending loss characteristics of the multi-core optical fibers according to embodiment examples 1 and 2 were measured. The results of the measurement are shown in FIG. 17. In FIG. 17, the line L3 indicates the microbending loss of the core portion A0 in embodiment example 1, whereas the line L4 indicates the microbending loss of the core portion A0 in embodiment example 2. As shown in FIG. 17, in both of embodiment examples 1 and 2, the microbending losses were small. For comparison purposes, the microbending loss of an SMF of which the outside diameter of the cladding portion is 125 micrometers is indicated by the line L5 as well.

Figure 18:
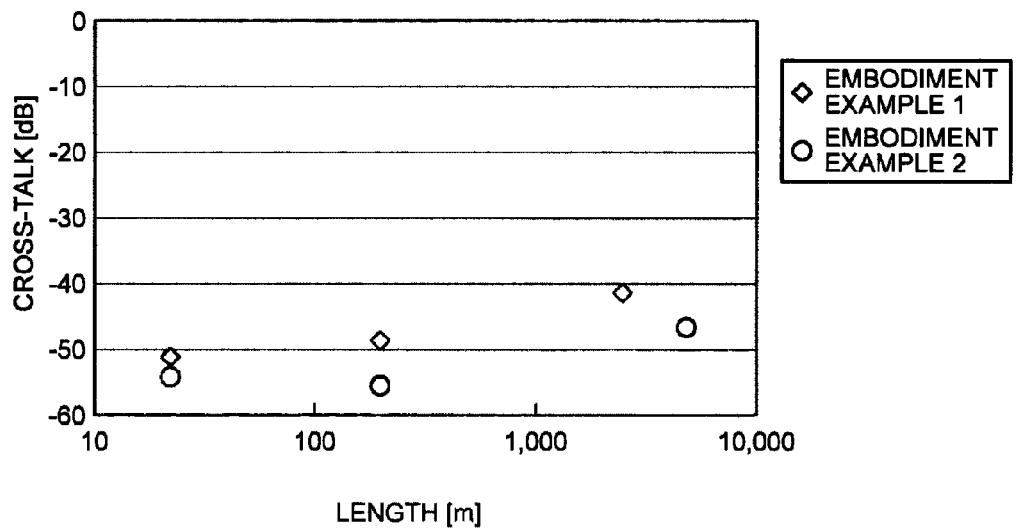
FIG. 18 is a graph of length dependency of cross-talk at a wavelength of 1.55 micrometers with respect to the multi-core optical fibers according to embodiment examples 1 and 2.

FIG. 18 is a graph of length dependency of cross-talk at a wavelength of 1.55 micrometers with respect to the multi-core optical fibers according to embodiment examples 1 and 2. As shown in FIG. 18, in all of the pieces of data, the cross-talk of the light between the core portions is equal to or smaller than −35 decibels, or even equal to or smaller than −40 decibels, at a wavelength of 1.55 micrometers. Therefore, the cross-talk between the light signals that are individually transmitted through the core portions is sufficiently small.

Multi-core optical fibers in which cores are arranged similarly to embodiment examples 1 to 3 and interval distances are set to about 45 micrometers (embodiment example 4) or about 48 micrometers (embodiment example 5) were manufactured. In the multi-core optical fibers according to embodiment examples 4 and 5, similarly to embodiment example 3, a central core is referred to as a core portion A4 and surrounding core portions are referred to as B4, C4, D4, E4, F4, and G4 in a clockwise direction. The interval distances, inter-core angles, and amounts of eccentricity were measured. The inter-core angle is defined as an internal angle of a vertex at the center core portion A4 among internal angles of a triangle formed by three core portions including the central core portion A4. The amount of eccentricity is defined as a distance between the center of the central core portion A4 and the center of the cladding portion.

Figure 19A:
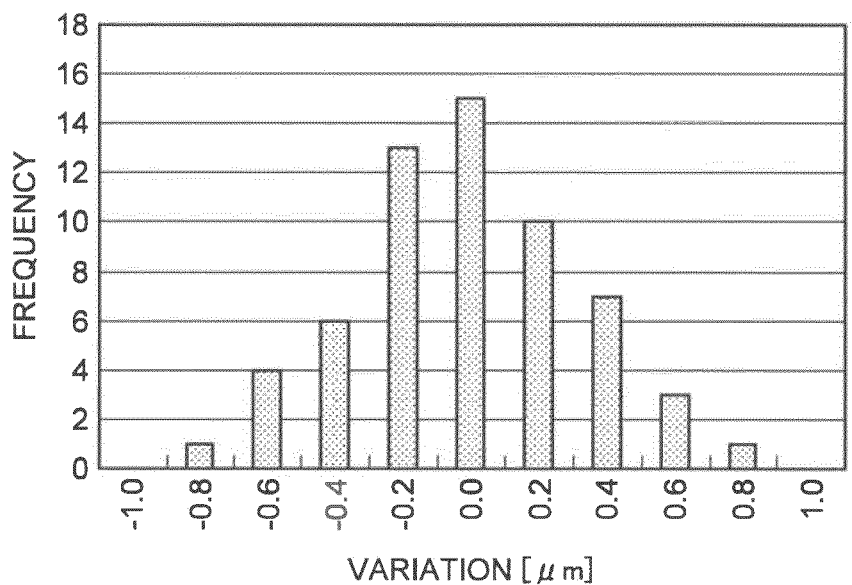
FIG. 19A is a histogram of variations of interval distances between a central core portion and each of surrounding core portions from the designed values, the interval distances being measured for the four multi-core optical fibers of embodiment example 4 and the six multi-core optical fibers of embodiment example 5.

FIG. 19A is a histogram of variations of interval distances between a central core portion and each of surrounding core portions from the designed values, the interval distances being measured for the four multi-core optical fibers of embodiment example 4 and the six multi-core optical fibers of embodiment example 5. As shown in FIG. 19A, variation in the interval distance in each multi-core optical fiber was suppressed to about ±0.5 micrometer. The average of standard deviation of the variation was 0.3 micrometer and the maximum value was 0.5 micrometer.

Figure 19B:
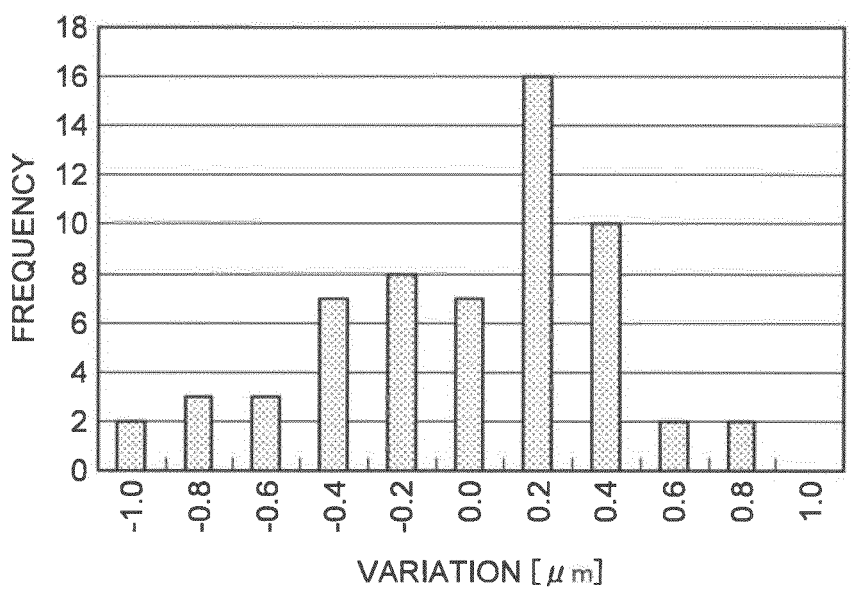
FIG. 19B is a histogram of variations of interval distances between the surrounding core portions from the designed values, the interval distances being measured for the multi-core optical fibers of embodiment examples 4 and 5.

FIG. 19B is a histogram of variations of interval distances between the surrounding core portions from the designed values, the interval distances being measured for the multi-core optical fibers of embodiment examples 4 and 5. As shown in FIG. 19B, variation in the interval distance in each multi-core optical fiber was suppressed to about ±0.5 micrometer. The average of standard deviation of the variation was 0.4 micrometer and the maximum value was 0.6 micrometer.

Figure 19C:
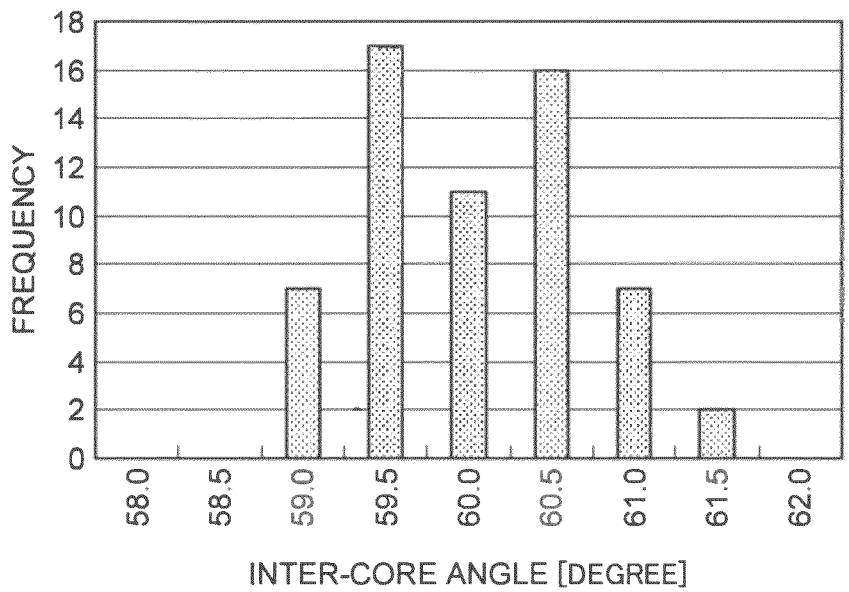
FIG. 19C is a histogram of inter-core angles measured for the multi-core optical fibers of embodiment examples 4 and 5.

FIG. 19C is a histogram of inter-core angles measured for the multi-core optical fibers of embodiment examples 4 and 5. As shown in FIG. 19C, variation in the inter-core angles in each multi-core optical fiber was suppressed to about ±1.5 degrees. The average of standard deviation of the variation was 0.6 degree and the maximum value was 0.8 degree. The average of the amount of eccentricity in each multi-core optical fiber of embodiment examples 4 and 5 was 0.7 micrometer and the maximum value was 1.1 micrometers.

Figure 19D:
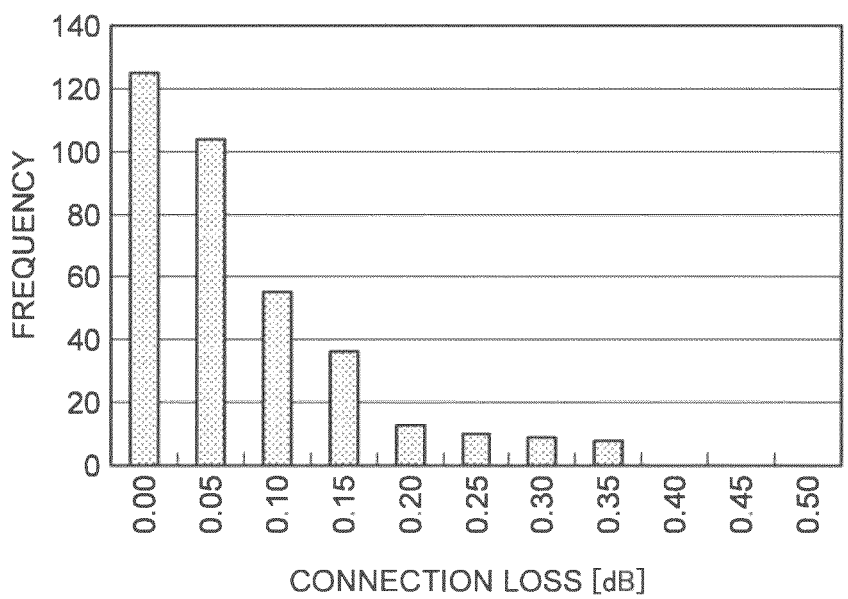
FIG. 19D is a histogram of calculated connection loss.

Based on the interval distances and the inter-core angles shown in FIGS. 19A and 19C, the amount of axis deviation of a core portion, which is a deviation from an ideal designed position due to the variations in both of the interval distances and the inter-core angles, was obtained, and connection losses of the multi-core optical fibers due to the axis deviation were calculated. FIG. 19D is a graph of the calculated connection losses. In the calculation, as a target connection multi-core optical fiber to be connected with each of the multi-core optical fibers of embodiment examples 4 and 5, an ideal multi-core optical fiber, all inter-core angles of which are 60 degrees and interval distances of which is average value of the interval distances in each multi-core optical fiber of each embodiment example, was assumed. It was also assumed that the connection is performed without causing the axis deviation as for the connection of the central core portions with each other. As for a rotational direction around an axis of a multi-core optical fiber, all cases where a position of each of surrounding core portions in the rotational direction is optimized, are considered in the calculation so that a specific dependency of angle do not occur. And also, MFD of each core portion of each of the multi-core optical fiber of each embodiment example and the target connection multi-core optical fiber was assumed to be 10.4 micrometer. By above assumptions, factors other than the connection loss caused by the variations in both of the interval distances and the inter-core angles were excluded in the calculation.

As shown in FIG. 19D, the connection loss due to the axis deviation was equal to or smaller than 0.34 decibel at a maximum, and the average was 0.08 decibel.

In the exemplary embodiments described above, the number of the core portions is 2 or 7; however, the present invention is not limited to these examples. It is possible to apply the present invention to a multi-core optical fiber in which the number of the core portions is, for example, three or more. In those situations, the interval distances between each of the core portions and the core portions that are positioned adjacent thereto are configured so that, in accordance with the number of the adjacent core portions, the cross-talk of the light between those core portions is, with respect to the total length, equal to or smaller than −35 decibels at a wavelength of 1.55 micrometers.

In the exemplary embodiments described above, the core diameters and the relative refractive-index differences of all the core portions are equal; however, the present invention is not limited to these examples. For example, by configuring the core diameters or the relative refractive-index differences of the core portions so as to be slightly different from one another, it is possible to configure the cross-talk of the light between the core portions with respect to the total length so as to be even smaller, because the value of "f" in the expression presented above $P=f \times \sin^2(\chi z)$ becomes smaller than 1. Alternatively, it is possible to configure the interval distance between the core portions so as to be shorter.

For example, in the case where another core portion of which the core diameter is different from that of the core portions in calculation example 22 by 0.1 micrometer is provided in the pivot position of a triangle grid formed by the core portions shown in calculation example 22, the value of "f" in the expression above for said another core portion and the core portions positioned in the surrounding thereof is equal to $1.5 \times 10^{-5}$. As a result, it is possible to configure the cross-talk of the light between the core portions so as to be −48.2 decibels at maximum, which is smaller than −35 decibels. Accordingly, even if the interval distance between the core portions is configured so as to be 48.4 micrometers, which is obtained by multiplying 83.3 micrometers (i.e., the interval distance required by a 100-kilometer transmission) by $1/\sqrt{3}$, it is possible to configure the cross-talk of the light so as to be equal to or smaller than −35 decibels.

Further, in the situation where the core diameters and the relative refractive-index differences of the core portions are configured so as to be slightly different from one another, it is also effective to configure, in advance, the differences so as to be slightly larger than initially designed values, because there is a possibility that values of the core diameters and the relative refractive-index differences may unexpectedly be closer to one another due to an impact from fluctuations in the length direction.

When the interval distance is longer, although the cross-talk becomes smaller, the density with which the core portions are arranged also becomes lower. In the case where a normalized core number (i.e., the number of the core portions per a unit cross-section area) is defined as an indicator of the density of the core portions, when the decrease in the cross-talk is compared with the decrease in the normalized core number in relation to an increase in the interval distance, the decreasing rate of the cross-talk is higher. In other words, even considering the fact that the effect caused by arranging the core portions with a high density becomes smaller, it is desirable to configure the interval distance so as to be longer for the purpose of reducing cross-talk. Thus, it is also effective to configure the interval distance so as to be longer for the purpose of adjusting the values of cross-talk that are actually obtained.

Further, the multi-core optical fiber according to an aspect of the present invention includes a plurality of core portions, and the core portions are positioned so as to have a predetermined interval distance therebetween. Thus, some of the core portions are positioned close to the outer circumference of the cladding portion. For this reason, it is necessary to take into consideration the impact of microbending for each of the core portions. A microbending loss is defined as an increase amount in the transmission loss that, when a lateral pressure is applied to an optical fiber, occurs due to small bending applied to the optical fiber by small irregularities or the like on the surface of the object (e.g., a bobbin) that has applied the lateral pressure to the optical fiber. In the following sections, the impact of such microbending will be explained, based on multi-core optical fibers manufactured as reference examples 1 and 2.

Multi-core optical fibers in which the core diameters and the relative refractive-index differences of the core portions are slightly different from each other were manufactured as reference examples 1 and 2 according to the present invention. More specifically, first, a glass preform was manufactured by, in a glass tube that is made from pure silica, disposing capillaries so as to form a regular hexagon, and also, disposing another capillary at the center of the regular hexagon, and further filling the space between the glass tube and the capillaries with a large number of filling capillaries each of which is solid (i.e., not hollow) and is made of pure-silica glass, each of the capillaries including: a core portion of which the diameter is approximately 7 millimeters and which had been doped with germanium so that the relative refractive-index difference with respect to pure silica was 0.3%; and a cladding portion that was formed so as to surround the core portion and so as to have a thickness approximately four times larger than the diameter of the core portion. The diameter of the glass preform (i.e., the diameter of the glass tube made from pure-silica) is 24 millimeters in reference example 1 and is 36 millimeters in reference example 2.

When the space was filled with the filling capillaries, markers for identifying the positions of the core portions were prepared by replacing some of the filling capillaries in certain positions with capillaries each of which is hollow and is made from pure-silica glass. After that, the multi-core optical fibers serving as reference examples 1 and 2 were drawn from the glass preform. In the manufactured multi-core optical fibers, the outside diameter of the cladding portion was 141 micrometers in reference example 1 and was 215 micrometers in reference example 2. In both of reference examples 1 and 2, the coating was formed so as to have a thickness of approximately 37.5 micrometers.

Figure 20:
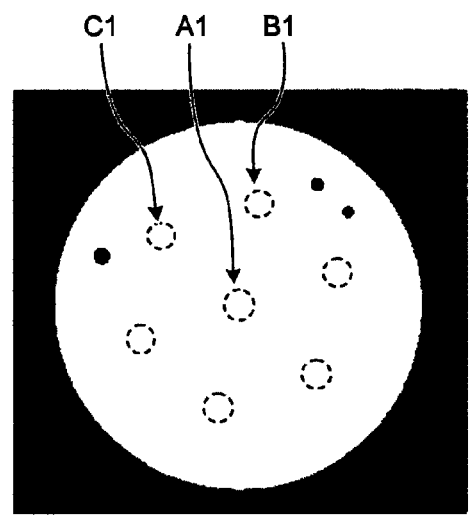
FIG. 20 is a schematic drawing of a cross section of a multi-core optical fiber according to reference example 1.
Figure 21:
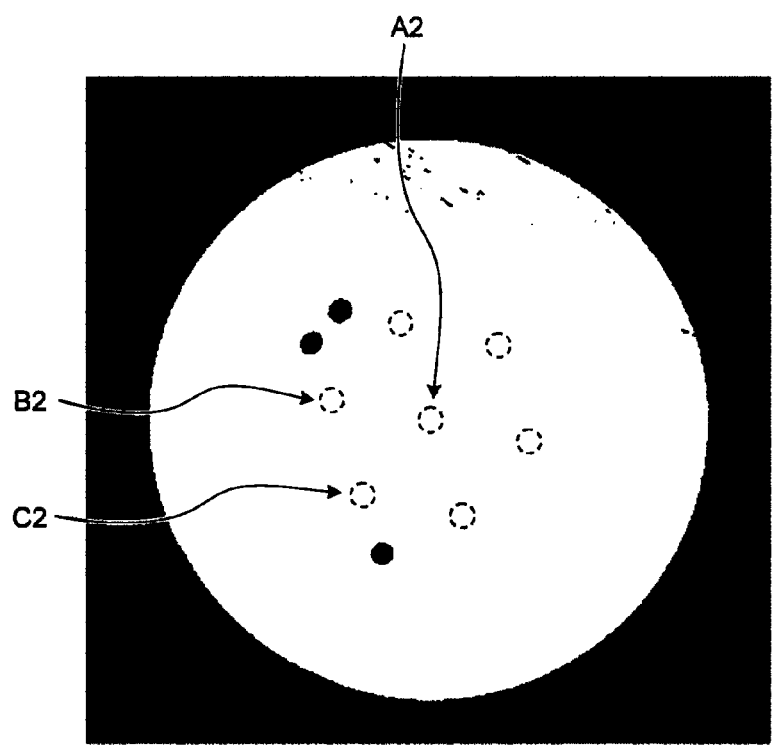
FIG. 21 is a schematic drawing of a cross section of a multi-core optical fiber according to reference example 2.

FIG. 20 is a schematic drawing of a cross section of the multi-core optical fiber according to reference example 1. FIG. 21 is a schematic drawing of a cross section of the multi-core optical fiber according to reference example 2. In FIGS. 20 and 21, the circular areas defined by the broken lines indicate the positions of the core portions. Each of the reference symbols A1, B1, C1, A2, B2, and C2 denotes a different one of the core portions. The filled circles indicate the markers. As shown in FIGS. 20 and 21, the multi-core optical fibers according to reference examples 1 and 2 are configured so that it is possible to identify certain circumferential direction of the cladding portion by using the markers so that it is possible to identify the position of each of the core portions with higher certainty.

Next, the core diameters, the relative refractive-index differences of the core portions A1, B1, C1, A2, B2, and C2 in the multi-core optical fibers according to reference examples 1 and 2, as well as the optical characteristics of these core portions will be explained. FIG. 22 is a table showing the core diameters and the relative refractive-index differences of the core portions A1, B1, C1, A2, B2, and C2 in the multi-core optical fibers according to reference examples 1 and 2, as well as the optical characteristics of these core portions. In FIG. 22, "$\lambda_{cc}$" denotes a cable cut-off wavelength defined by the ITU-T G. 650.1. The values of the transmission loss, the wavelength dispersion, the dispersion slope, Aeff, and the bending loss are values at a wavelength of 1.55 micrometers. The other structural characteristics of the multi-core optical fibers according to reference examples 1 and 2 are shown in FIG. 28, which will be described later. For example, each interval distance of adjacent core portions is 40 micrometers.

Figure 23:
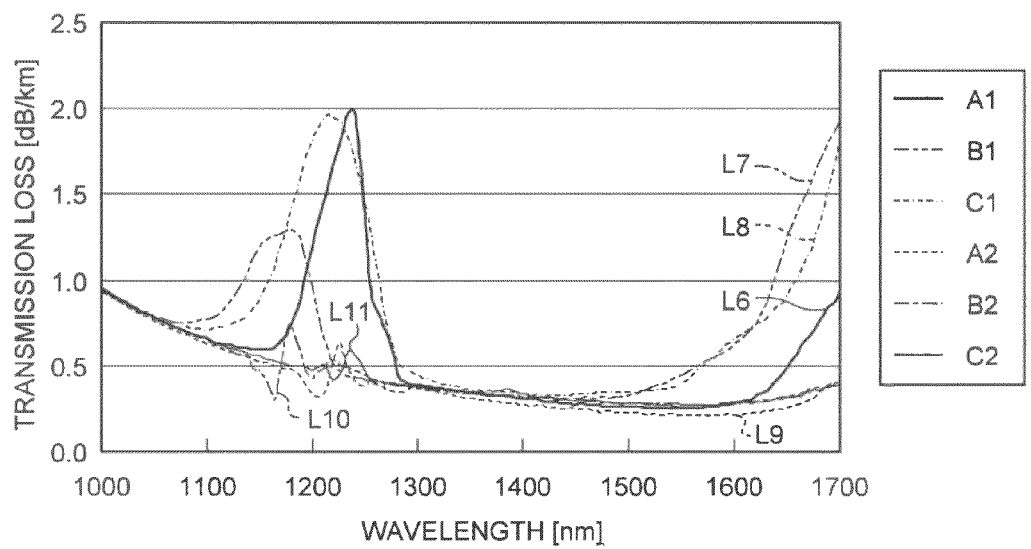
FIG. 23 is a graph of transmission loss spectra of the core portions in the multi-core optical fibers according to reference examples 1 and 2.

FIG. 23 is a graph of transmission loss spectra of the core portions A1, B1, C1, A2, B2, and C2 in the multi-core optical fibers according to reference examples 1 and 2. In FIG. 23, the lines L6 to L8 indicate the spectra of the core portions A1, B1, and C1, whereas the lines L9 to L11 indicate the spectra of the core portions A2, B2, and C2. As shown with the lines L9 to L11, no significant increase in the transmission loss was observed in the wavelength range of 1600 nanometers and longer, for reference example 2 in which the outside diameter of the cladding portion is large (i.e., 215 micrometers).

In contrast, as shown with the lines L6 to L8, in reference example 1 in which the outside diameter of the cladding portion is small (i.e., 141 micrometers), a significant increase in the transmission loss was observed in the wavelength range of 1600 nanometers and longer. In particular, with respect to the core portions B1 and C1 that are positioned closer to the outer circumference of the cladding portion, a more significant increase in the transmission loss was observed. A cause of this significant increase in the transmission loss in the longer wavelength bandwidth is considered to be an increase in the microbending loss, which is a component of the transmission loss, that has occurred because the distance between the core portions and the outer circumference of the cladding portion has become shorter.

Figure 24:
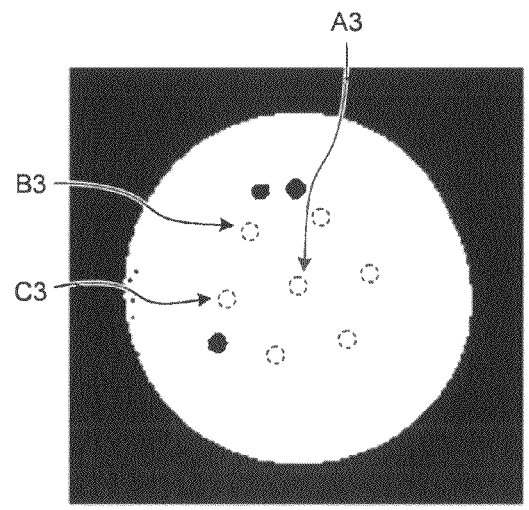
FIG. 24 is a schematic drawing of a cross section of a multi-core optical fiber manufactured as reference example 3.

FIG. 24 is a schematic drawing of a cross section of a multi-core optical fiber manufactured as reference example 3. In FIG. 24, the circular areas defined by the broken lines indicate the positions of the core portions. Each of the reference symbols A3, B3, and C3 denotes a different one of the core portions. The filled circles indicate the markers. As for the characteristics of the core portions, the core diameter of the core portion A3 is 10.6 micrometers, whereas the core diameter of the core portion B3 is 10.4 micrometers, and the core diameter of the core portion C3 is 10.2 micrometers. The relative refractive-index differences are all 0.31%. The interval distance between the core portions is 46 micrometers.

FIG. 25 is a table showing the core diameters and the relative refractive-index differences of the core portions A3, B3, and C3 in the multi-core optical fibers according to reference example 3, as well as the optical characteristics of these core portions. In FIG. 25, the values of the transmission loss, the wavelength dispersion, the dispersion slope, Aeff, and the bending loss are values at a wavelength of 1.55 micrometers. The other structural characteristics of the multi-core optical fibers according to reference example 3 are shown in FIG. 28, which will be described later.

Figure 26:
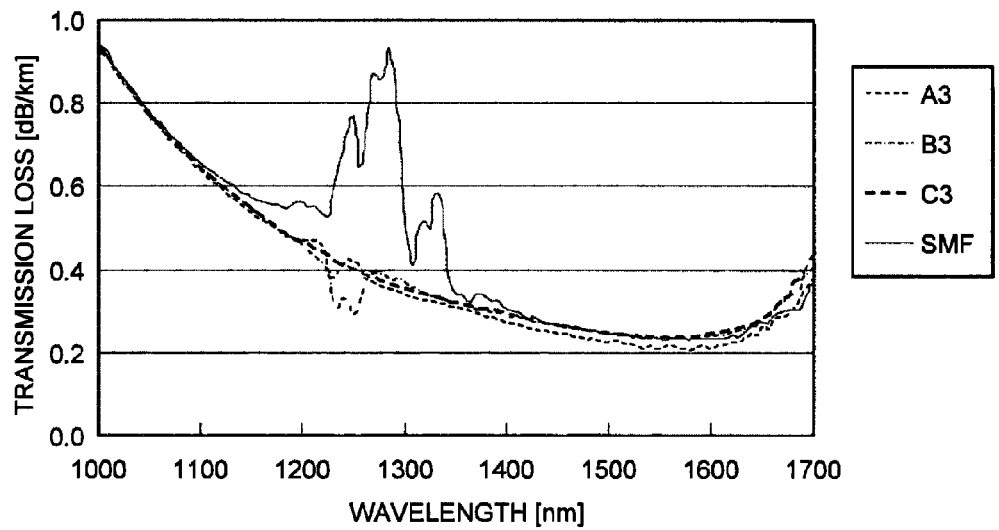
FIG. 26 is a graph of transmission loss spectra of core portions in the multi-core optical fiber according to reference example 3 and a transmission loss spectrum of a single-core SMF.

FIG. 26 is a graph of transmission loss spectra of the core portions A3, B3, and C3 in the multi-core optical fiber according to reference example 3 and a transmission loss spectrum of a single-core SMF. With respect to the core portion in the single-core SMF, the core diameter is 10.4 micrometers, whereas the relative refractive-index difference is 0.31%. As shown in FIG. 26, the transmission loss spectrum of each of the core portions in the multi-core optical fiber has characteristics that are substantially the same as those of the transmission loss spectrum of the single-core SMF.

Figure 27:
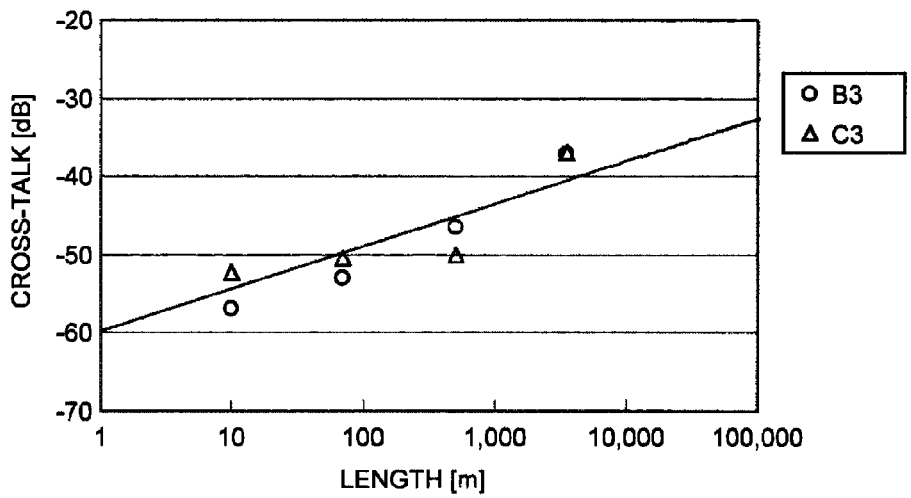
FIG. 27 is a graph of dependency on the length of a multi-core optical fiber with respect to cross-talk between one of the core portions and another core portion positioned in the surrounding of the one of the core portions, in the multi-core optical fiber according to reference example 3.

Further, FIG. 27 is a graph of dependency on the length of a multi-core optical fiber with respect to cross-talk between one of the core portions B3 and C3 and another core portion positioned in the surrounding of the one of the core portions, in the multi-core optical fiber according to reference example 3. The wavelength is 1550 nanometers. The solid line in FIG. 27 indicates an approximate straight line according to the least squares method. As shown in FIG. 27, when the multi-core optical fiber according to reference example 3 is used, in the case where the total length is 3.5 kilometers, cross-talk of −38 decibels is realized. In the case where the total length is shorter, even smaller cross-talk is realized.

FIG. 28 is a table showing the structural characteristics of the multi-core optical fibers of the reference examples 1 to 3. In FIG. 28, a thickness of a cladding portion represents the shortest distance between the center of a core portion that is closest to the outer circumference of the cladding portions from among the core portions and the outer circumference of the cladding portion.

As described above, the multi-core optical fiber according to the present invention is useful when it is applied for use in optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core optical fiber comprising:
   a plurality of core portions; and
   a cladding portion that is positioned so as to surround outside of the core portions and has a refractive index that is lower than a refractive index of each of the core portions, wherein
   a diameter of each of the core portions is equal to or smaller than 12 micrometers,
   a relative refractive-index difference of each of the core portions with respect to the cladding portion is equal to or larger than 0.2%,
   a cut-off wavelength is equal to or shorter than 1.53 micrometers,
   a bending loss caused by winding around a diameter of 20 millimeters at a wavelength of 1.55 micrometers is equal to or smaller than 10 dB/m,
   an effective core area of each of the core portions at a wavelength of 1.55 micrometers is equal to or larger than 30 µm$^2$, and
   an interval distance between each of the core portions and another one of the core portions positioned adjacent thereto is set so that cross-talk of light between these core portions for a total length is equal to or smaller than −35 decibels at a wavelength of 1.55 micrometers.

2. The multi-core optical fiber according to claim 1, wherein
 a number of the core portions is 2,
 the total length is equal to or longer than 1 meter, and
 the interval distance is equal to or longer than 27 micrometers.

3. The multi-core optical fiber according to claim 2, wherein
 the diameter of each of the core portions ranges from 9.5 micrometers to 12 micrometers,
 the relative refractive-index difference ranges from 0.2% to 0.3%, and
 the interval distance is equal to or longer than 44 micrometers.

4. The multi-core optical fiber according to claim 2, wherein
 the diameter of each of the core portions is equal to or smaller than 8.5 micrometers,
 the relative refractive-index difference is equal to or larger than 0.4%, and
 the interval distance ranges from 27 micrometers to 40 micrometers.

5. The multi-core optical fiber according to claim 1, wherein
 a number of the core portions is 7,
 the total length is equal to or longer than 1 meter, and
 the interval distance is equal to or longer than 30 micrometers.

6. The multi-core optical fiber according to claim 5, wherein
 the diameter of each of the core portions ranges from 9.5 micrometers to 12 micrometers, the relative refractive-index difference ranges from 0.2% to 0.3%, and
 the interval distance is equal to or longer than 49 micrometers.

7. The multi-core optical fiber according to claim 5, wherein
 the diameter of each of the core portions is equal to or smaller than 8 micrometers, the relative refractive-index difference is equal to or larger than 0.5%, and
 the interval distance ranges from 30 micrometers to 40 micrometers.

8. The multi-core optical fiber according to claim 1, wherein a shortest distance between a center of one of the core portions that is positioned closest to an outer circumference of the cladding portion and the outer circumference of the cladding portion is equal to or longer than 30 micrometers.

9. The multi-core optical fiber according to claim 1, wherein a shortest distance between a center of one of the core portions that is positioned closest to an outer circumference of the cladding portion and the outer circumference of the cladding portion is equal to or longer than 50 micrometers.

* * * * *